US011126781B2

(12) United States Patent
Kim et al.

(10) Patent No.: US 11,126,781 B2
(45) Date of Patent: Sep. 21, 2021

(54) INTEGRATED CIRCUIT INCLUDING STANDARD CELL AND METHOD AND SYSTEM FOR DESIGNING AND MANUFACTURING THE SAME

(71) Applicant: SAMSUNG ELECTRONICS CO., LTD., Suwon-si (KR)

(72) Inventors: Kyung-bong Kim, Hwaseong-si (KR); Min-su Kim, Hwaseong-si (KR); Dae-seong Lee, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 16/387,837

(22) Filed: Apr. 18, 2019

(65) Prior Publication Data
US 2019/0325107 A1    Oct. 24, 2019

(30) Foreign Application Priority Data

Apr. 19, 2018 (KR) .................. 10-2018-0045747

(51) Int. Cl.
| G06F 30/398 | (2020.01) |
| H01L 23/522 | (2006.01) |
| H01L 27/02  | (2006.01) |
| G06F 30/392 | (2020.01) |
| G06F 119/18 | (2020.01) |

(52) U.S. Cl.
CPC .......... G06F 30/398 (2020.01); G06F 30/392 (2020.01); H01L 23/5226 (2013.01); H01L 27/0207 (2013.01); *G06F 2119/18* (2020.01)

(58) Field of Classification Search
None
See application file for complete search history.

(56) References Cited

U.S. PATENT DOCUMENTS

| 6,584,610 B1* | 6/2003 | Wu ...................... G06F 30/398 |
| | | 716/52 |
| 7,287,237 B2 | 10/2007 | Morton |
| 8,789,004 B2* | 7/2014 | Chen ...................... G06F 30/30 |
| | | 716/134 |
| 9,653,413 B2 | 5/2017 | Frederick, Jr. et al. |
| 9,727,685 B2 | 8/2017 | Yuan et al. |
| 2016/0098508 A1 | 4/2016 | Baek et al. |
| 2017/0032073 A1* | 2/2017 | Chen ...................... G06F 30/394 |
| 2017/0032074 A1 | 2/2017 | Song et al. |
| 2017/0077910 A1 | 3/2017 | Kim et al. |
| 2017/0116366 A1 | 4/2017 | Seo et al. |

(Continued)

*Primary Examiner* — Steven M Christopher
(74) *Attorney, Agent, or Firm* — F. Chau & Associates, LLC

(57) ABSTRACT

An integrated circuit including standard cells, a method and a computing system for designing and fabricating the same are provided. A computer-implemented method involves placing, based on a standard cell library, standard cells of an integrated circuit to be fabricated, and routing the placed standard cells. A position of a first wiring of a placed cell among the placed standard cells may be adjusted based on a position of a second wiring used for the routing. The first wiring is provided from at least one standard cell, formed in a same layer as that of the second wiring, and spaced from the second wiring in a first direction. An integrated circuit layout having the adjusted position of the first wiring, is produced.

5 Claims, 23 Drawing Sheets

(56) References Cited

U.S. PATENT DOCUMENTS

| | | |
|---|---|---|
| 2017/0256446 A1 | 9/2017 | Cha et al. |
| 2017/0277819 A1* | 9/2017 | Kim ...................... G06F 30/392 |
| 2017/0292993 A1 | 10/2017 | Yoon et al. |
| 2018/0144082 A1* | 5/2018 | Hanchinal ............. G06F 30/392 |
| 2019/0109586 A1 | 4/2019 | Lee et al. |

* cited by examiner

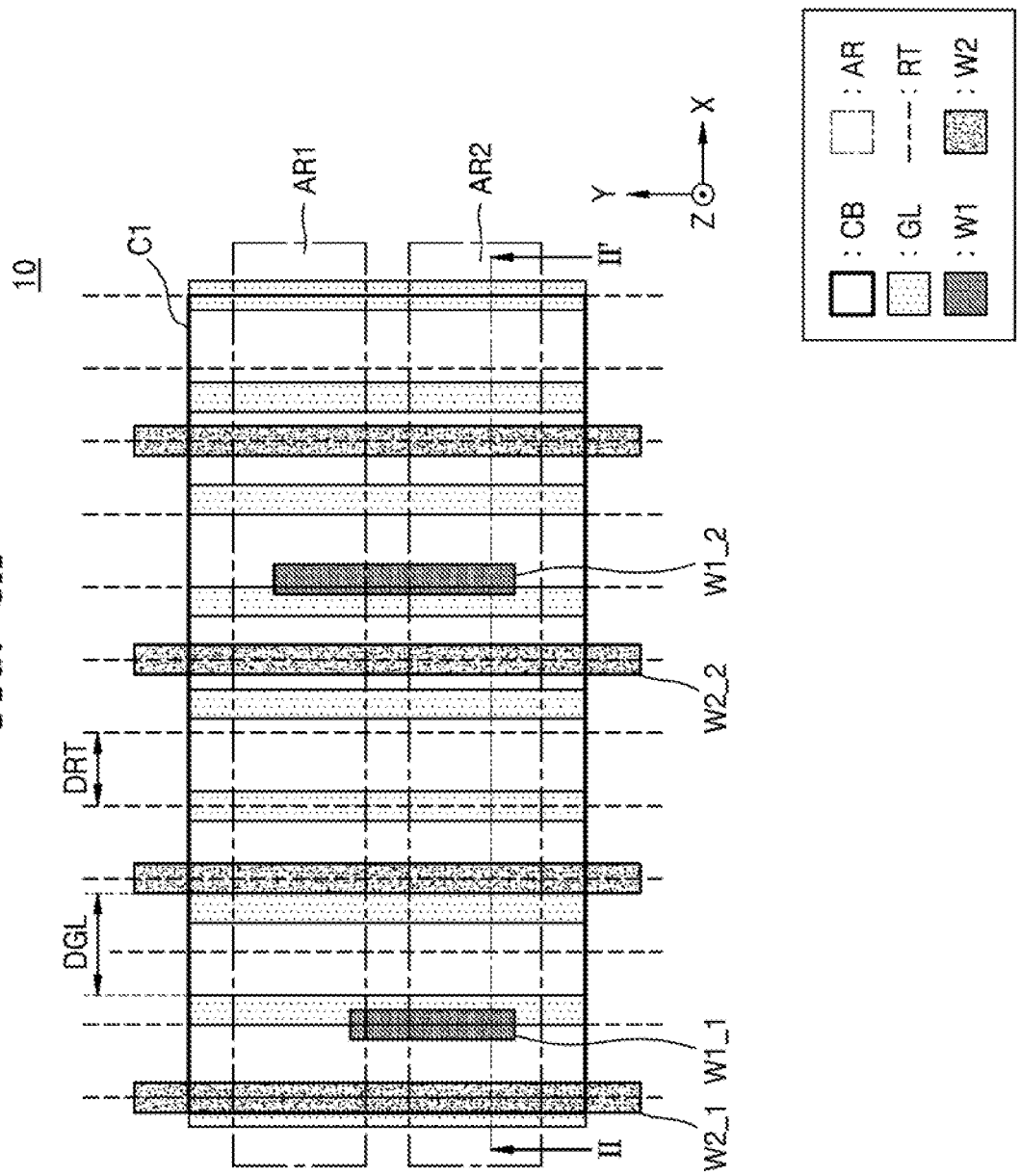

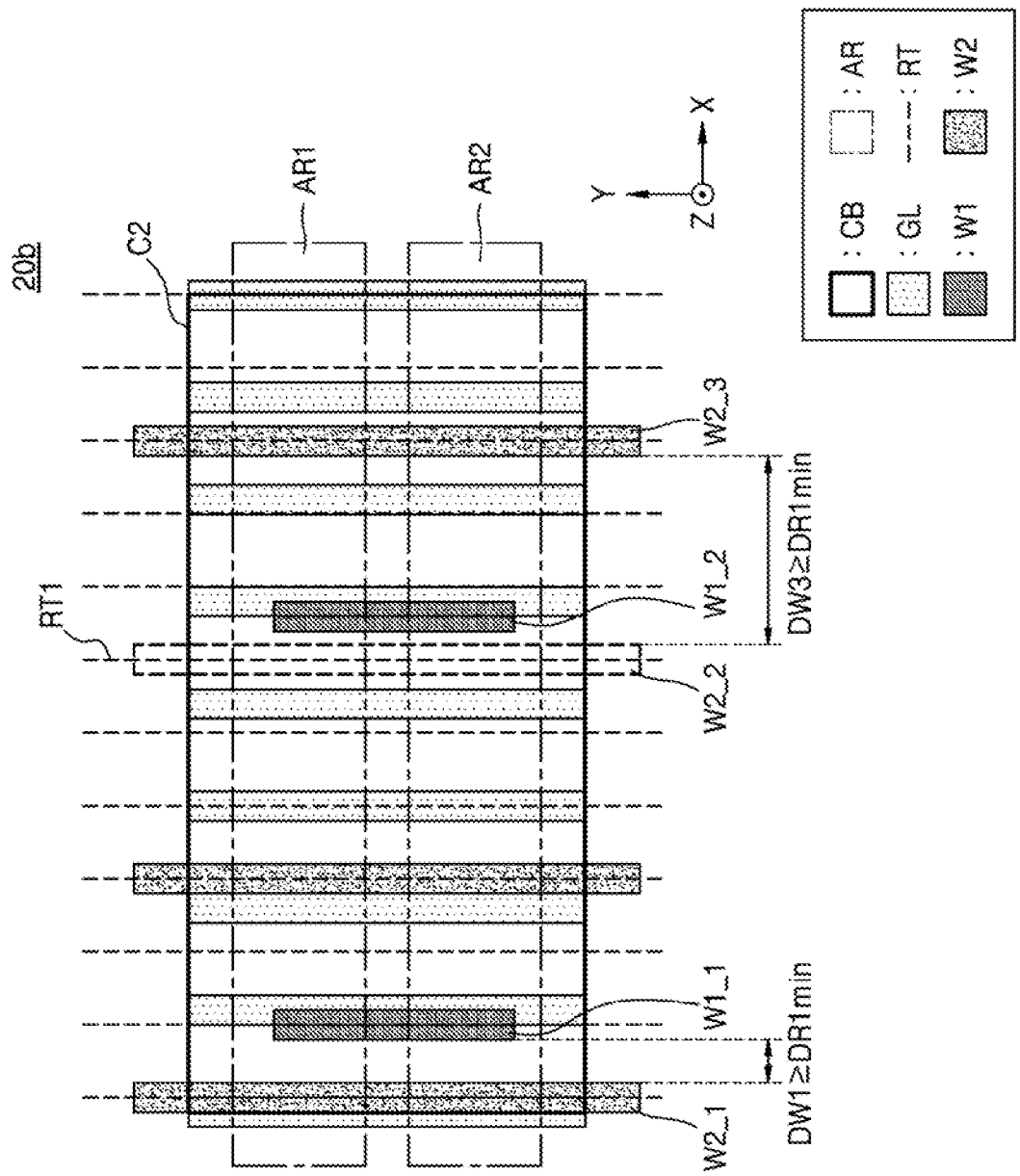
FIG. 5 (COMPARATIVE EXAMPLE)

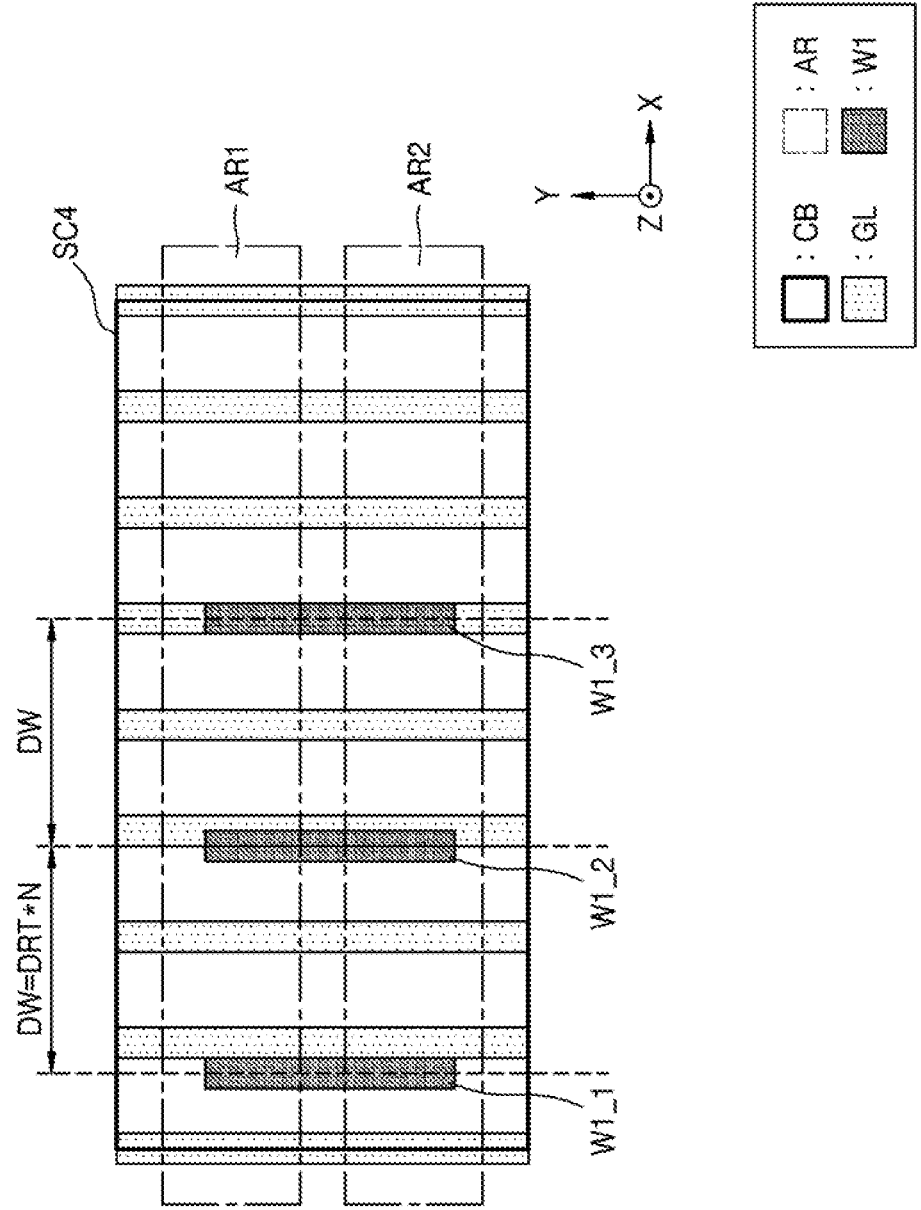

INTEGRATED CIRCUIT INCLUDING STANDARD CELL AND METHOD AND SYSTEM FOR DESIGNING AND MANUFACTURING THE SAME

CROSS-REFERENCE TO RELATED APPLICATION

This application claims the benefit of Korean Patent Application No. 10-2018-0045747, filed on Apr. 19, 2018, in the Korean Intellectual Property Office, the disclosure of which is incorporated by reference herein in its entirety.

TECHNICAL FIELD

The inventive concept relates to an integrated circuit (IC), and more particularly, to an integrated circuit including standard cells, a method and a computing system for designing and fabricating the same.

DISCUSSION OF THE RELATED ART

As configurations for integrated circuits have recently become more complex and semiconductor fabrication processes more refined, a large number of semiconductor devices can now be integrated in an integrated circuit. With recent advances, gate lengths of the semiconductor devices in the integrated circuit have continually decreased, but the wiring for connecting the devices are not easily reduced at the same rate as the devices due to process limitations. Accordingly, as the real estate occupied by wiring has increased in proportion in the integrated circuit, optimization of wiring is a way to reduce a layout area of the IC.

SUMMARY

According to an aspect of the inventive concept, there is provided a computer-implemented method in which at least one processor executes instructions for placing, based on a standard cell library, standard cells of an integrated circuit to be fabricated, and routing the placed standard cells. A position of a first wiring of a placed cell is adjusted, based on a position of a second wiring used for the routing. The first wiring is provided from at least one standard cell, formed in a same layer as that of the second wiring, and spaced from the second wiring in a first direction. An integrated circuit layout having the adjusted position of the first wiring, is produced.

According to another aspect of the inventive concept, there is provided a computing system for designing an integrated circuit including standard cells. The computing system includes a memory storing a cell library including data regarding the standard cells, and instructions representing procedures, and a processor configured to access the memory and execute the procedures. The processor may include: a placement and routing engine that places and routes the standard cells based on the cell library and adjusts, in an instance of at least one standard cell, positions of internal wirings parallel to gate lines, based on positions of routing wirings that are placed in parallel to the internal wirings; and a design rule check (DRC) engine that performs design rule check with respect to layout data that is produced by the placement and routing engine.

According to another aspect of the inventive concept, there is provided an integrated circuit including a first cell and a second cell corresponding to one same logic device, wherein each of the first cell and the second cell includes: a gate line pattern extending in a second direction; a first wiring pattern formed in a first wiring layer; a second wiring pattern, formed in a second wiring layer above the first wiring layer, and extending in the second direction; and a via electrically connecting the first wiring pattern and the second wiring pattern, wherein the gate line pattern of the first cell may be identical to the gate line pattern of the second cell, and the second wiring pattern of the first cell may be different from the second wiring pattern of the second cell.

BRIEF DESCRIPTION OF THE DRAWINGS

Embodiments of the inventive concept will be more clearly understood from the following detailed description taken in conjunction with the accompanying drawings in which like reference characters indicate like elements or operations, wherein:

FIG. 3A schematically shows a layout of an integrated circuit according to an example embodiment;

FIG. 5 shows a layout of an integrated circuit, according to a comparative example;

FIG. 9A shows an example of a layout of a standard cell according to an example embodiment.

DETAILED DESCRIPTION OF EMBODIMENTS

Hereinafter, example embodiments of the inventive concept will be described in detail with reference to the attached drawings.

Figure 1:
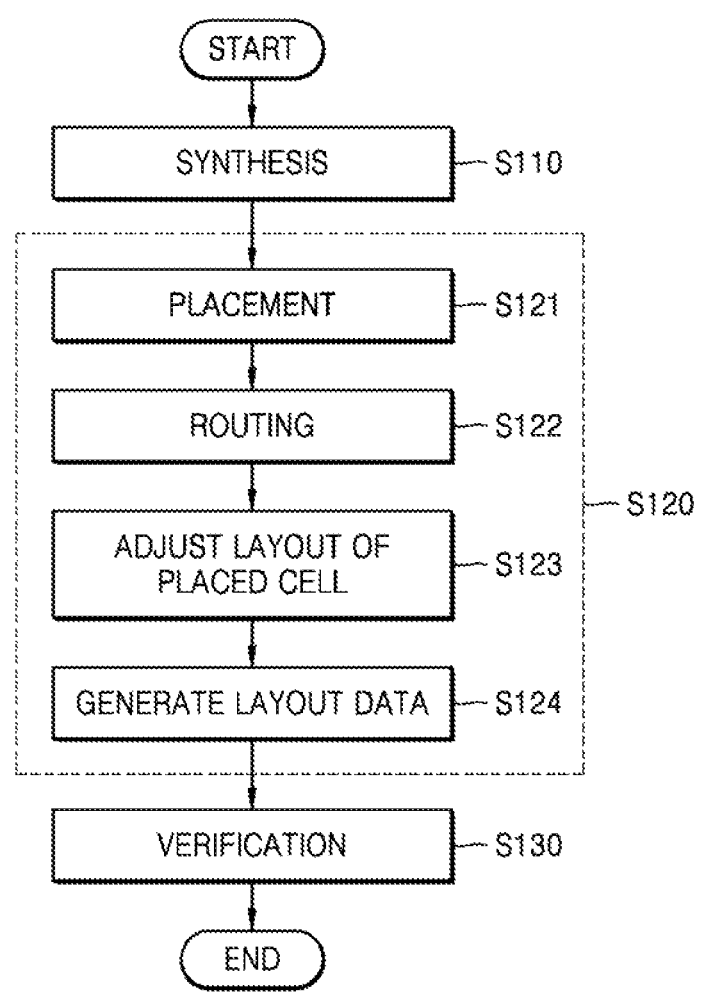
FIG. 1 is a flowchart schematically showing a method of designing an integrated circuit, according to an example embodiment.

FIG. 1 is a flowchart schematically illustrating a method of designing an integrated circuit, according to an example embodiment. Designing an integrated circuit involves designing and verifying a layout of the integrated circuit, and may be performed by processor execution of a design tool. The design tool may be a program or software module including instructions or procedures that are executed by a processor, and may be stored in a computer-readable storage medium. Accordingly, the method of designing the integrated circuit of FIG. 1 is a computer/processor implemented method for designing the integrated circuit.

Referring to FIG. 1, in operation S110, a logic synthesis operation for producing netlist data at a gate level from input data defined at a register transfer level (RTL) may be performed. For example, operation S110 may be performed by a logic synthesis tool. The logic synthesis tool may perform logic synthesis with reference to a standard cell library from input data, which is RTL data, that is written in a hardware description language (HDL) such as Very High Speed Integrated Circuit (VHSIC) hardware description language (VHDL) or Verilog, thereby producing netlist data including a bitstream or a netlist.

In operation S120, layout design may be performed to produce layout data from the netlist data. For instance, the operation S120 may be performed by using a layout tool (e.g., a Placement & Routing (P&R) tool). Operation S120 may include operations S121, S122, S123, and S124.

In operation S121, an operation of placing standard cells may be performed. For example, the layout tool may place the standard cells with reference to a standard cell library from the netlist data. The standard cells may have predetermined heights, and the layout tool may place the standard cells on grids that cross one another in predetermined lengths. In an integrated circuit, logic elements corresponding to the standard cells (e.g., an inverter, a flip-flop, a logic gate, and the like) may be used multiple times. Accordingly, the standard cells corresponding to the logic elements may be repeatedly placed, and each of the placed cells may be referred to as an instance of the standard cell. Instances corresponding to the same standard cells may have identical layouts.

In operation S122, a routing operation may be performed on the placed standard cells. For example, the layout tool may perform "routing" by electrically connecting inputs and outputs of the placed standard cells to outputs and inputs of other placed standard cells, that is, the instances of the standard cells, with routing wiring. As operations S121 and S122 are performed, a layout of the integrated circuit may be formed.

In operation S123, a layout of the placed cells may be adjusted. For example, the layout tool may change a layout of at least one of the placed standard cells in consideration of routing wirings. For instance, a wiring in a placed cell that is provided within the standard cell (referred to as an internal wiring) and a routing wiring used for routing current between placed cells may be formed in the same layer, and in an interim design stage, a distance between the internal wiring and the routing wiring may be less than a minimum distance between the wirings defined by the design rules (referred to as a minimum distance). (The design rules are effectively rules based on the instructions executed by the processor.) For optimized routing in the layout of the integrated circuit, the layout tool may, in the layout of the placed cell, adjust the positions of the internal wirings by considering the routing wirings.

In embodiments, the standard cell library may, for at least one standard cell, include a plurality of cells respectively having the same patterns for front-end layers (FELs) and different patterns for back-end layers (BELs), and in operation S123, the layout tool may adjust positions of the internal wirings by replacing the placed cell with another cell among the plurality of cells. In this case, the FEL is a layer related to formation of elements, for example, a capacitor, a resistor, and the like, and the BEL is a layer related to formation of wirings connecting inputs and outputs between the elements. In embodiments, the layout tool may, in the layout of the placed cell, shift the internal wiring such that the distance between the internal wiring and the routing wiring is equal to or greater than the minimum distance. A method of adjusting a position of the internal wiring of the placed cells will be described in detail below.

In operation S124, layout data may be produced with respect to the layout that is formed by performing the operations S121, S122, and S123. The layout data may have a format like, for example, Graphic Data System II (GDSII), and may include geometric information regarding the standard cells and the wirings. The production of layout data at this stage effectively generates a final IC layout (unless the verification in the next stage results in revisions to the layout data).

In operation S130, verification may be performed on the layout data. The verification may be performed by using a verification tool using techniques such as Design Rule Check (DRC), Layout Versus Schematic (LVS), Electrical Rule Check (ERC), and the like. Verification result data may be output from the verification tool as an output file.

In embodiments, based on the result of the verification performed in the operation S130, at least one of the operations S121, S122, and S123 may be repeated, and thus, layout data may be produced again, but revised. For example, as a result of DRC operations, with respect to at least one cell from among the placed standard cells, when there is a design rule error indicating that the distance between the internal wiring and the routing wiring is less than the minimum distance, the adjustment operation S123 may be performed, and the position of the internal wiring may be adjusted.

Figure 2:
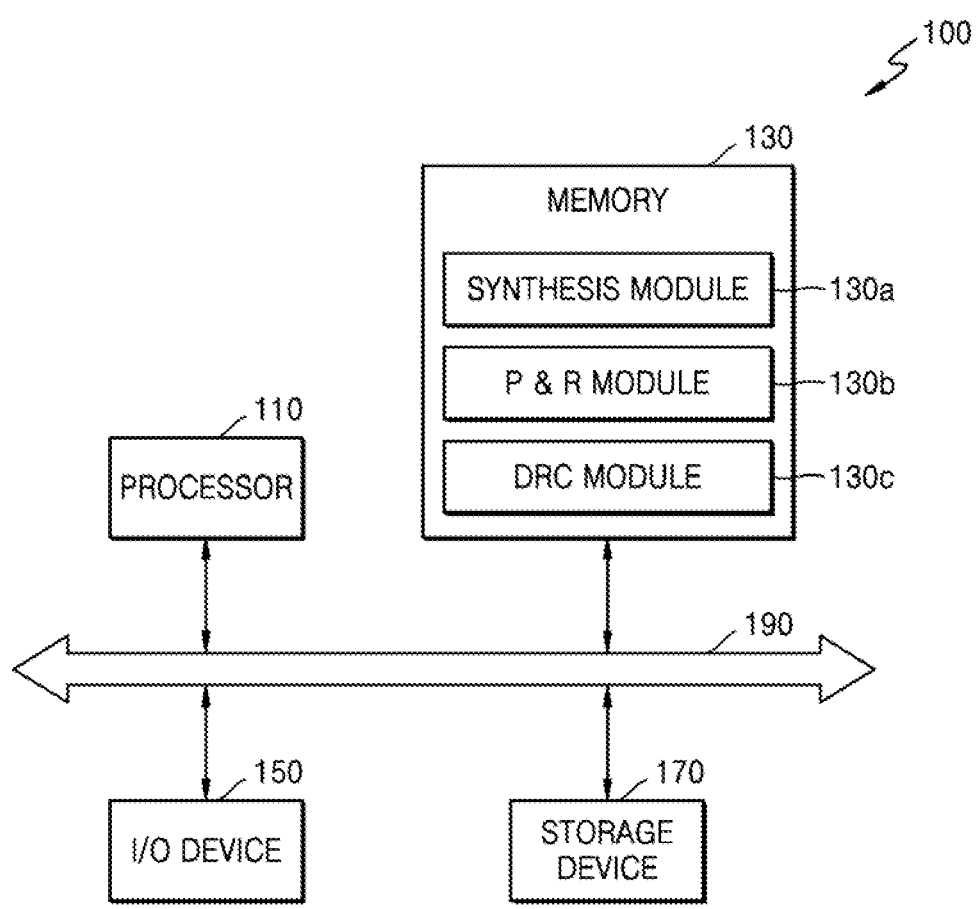
FIG. 2 is a block diagram showing a computing system for designing an integrated circuit, according to an example embodiment.

FIG. 2 is a block diagram showing a computing system 100, for designing the integrated circuit, according to an example embodiment. Computing system 100 (referred to interchangeably as an 'integrated circuit (IC) design system' hereinafter) may include a processor 110, a memory 130, an input and output (I/O) device 150, a storage device 170, and a bus 190. IC design system 100 may perform the integrated circuit design operation including the operations S110 through S130 shown in FIG. 1. In an embodiment, IC design system 100 may be implemented as an integrated device, and thus may also be referred to as an integrated circuit design device. IC design system 100 may be provided as a dedicated device to design an integrated circuit of a semiconductor device, but may also be a computer to drive various simulation tools or design tools. IC design system 100 may be a fixed-type computing system, for example, a desktop computer, a workstation, a server, and the like, and may alternatively be a portable computing system, for example, a laptop computer and the like.

The processor 110 may be configured to execute instructions each performing at least one of various operations for designing the integrated circuit. For example, the processor 110 may include a core that may execute an arbitrary instruction set (for example, Intel® Architecture-32 (IA-32), 64-bit extended IA-32, x86-64, Power PC, Sparc®, Microprocessor without Interlocked Pipeline Stages (MIPS)®, Advanced RISC Machine (ARM)®, IA-64, and so on) and may be any of a microprocessor, an application processor (AP), a digital signal processor (DSP), a graphics processing unit (GPU), and so on. The processor 110 may, via the bus 190, perform communication with the memory 130, the I/O device 150, and the storage device 170. The processor 110 may execute the integrated circuit designing operation by driving a synthesis module 130a, a Place and Routing (P&R) module 130b, and a DRC module 130c.

The memory 130 may store the synthesis module 130a, the P&R module 130b, and the DRC module 130c. The synthesis module 130a, the P&R module 130b, and the DRC module 130c may be loaded from the storage device 170 to the memory 130. The synthesis module 130a may be a program including a plurality of instructions for performing the logic synthesis operation according to operation S110 in FIG. 1. The P&R module 130b may be a program including a plurality of instructions for performing the layout design operation according to operation S120 in FIG. 1. The DRC module 130c may be a program including a plurality of instructions for performing the DRC operation according to operation S130 shown in FIG. 1. The memory 130 may be a volatile memory such as static random access memory (SRAM) or dynamic RAM (DRAM), or may be a non-volatile memory, e.g. phase-change RAM (PRAM), resistive RAM (ReRAM), nano floating gate memory (NFGM), polymer random access memory (PoRAM), magnetic RAM (MRAM), ferroelectric random access memory (FRAM), flash memory, and the like.

The I/O device 150 may control inputs and outputs from user interface devices. For example, the I/O device 150 may include an input device such as a keyboard, a mouse, a touchpad, and the like, and may receive input data that defines an integrated circuit. For example, the I/O device 150 may include an output device, e.g., a display, a speaker, and the like, and may display a display result, a routing result, layout data, a DRC result, and the like.

The storage device 170 may store a program, for example, the synthesis module 130a, the P&R module 130b, the DRC module 130c, and the like, and before the program is executed by the processor 110, the program or at least a part of the same may be loaded from the storage device 170 to the memory 130. The storage device 170 may also store data that is to be processed by the processor 110 or data that is processed by the processor 110. The storage device 170 may store data (e.g., a standard cell library, netlist data, and the like) that is to be processed by the program, for example, the synthesis module 130a, the P&R module 130b, the DRC module 130c, and the like, and data (for example, the DRC result, layout data, and the like) that is produced by the program.

The storage device 170 may include a non-volatile memory such as electrically erasable programmable read-only memory (EEPROM), flash memory, PRAM, RRAM, MRAM, FRAM, and the like, and may also include a storage medium, for example, a solid state drive (SSD), a hard disk drive (HDD), a magnetic tape, an optical disc, and a magnetic disc. In addition, the storage device 170 may be removable from the integrated circuit design system 100.

Figure 3B:
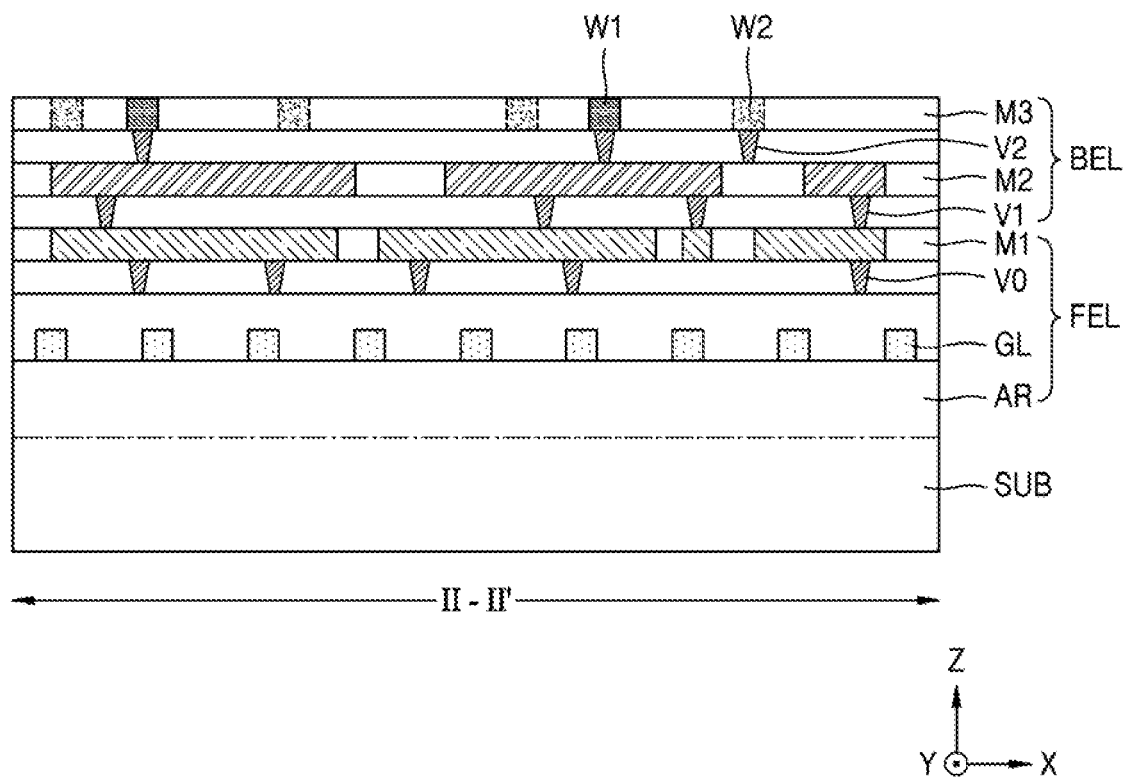
FIG. 3B is a cross-sectional view taken along line II-II' shown in FIG. 3A.

FIG. 3A schematically shows a layout of an integrated circuit according to an example embodiment, and FIG. 3B is a cross-sectional view taken along line II-II' shown in FIG. 3A.

Referring to FIG. 3A, an integrated circuit 10 may include at least one cell C1 defined by a cell boundary CB. The cell C1 is generated based on a standard cell provided from the standard cell library and may be referred to as an instance of the standard cell. The cell C1 is generated by placing the standard cell in operation S121 (see FIG. 1).

The cell C1 may include active regions ARs, gate lines GLs, and at least one internal wiring W1. The cell C1 may further include other elements (not shown), for example, an active contact, a gate contact, a via, and the like. In the inventive concept, the internal wiring W1, which is a wiring provided from the standard cell, is a wiring that extends in a same direction as an extension direction of the gate lines GLs. Although two internal wirings, that is, a first internal wiring W1_1 and a second internal wiring W1_2, are illustrated in FIG. 3A, more internal wirings, or just one internal wiring W1, may be provided in other examples of cell C1.

Referring to FIGS. 3A and 3B, the active regions ARs, e.g. a first active region AR1 and a second active region AR2, may be formed on a substrate SUB and may collectively have a profile in an X-Y plane that occupies a majority of the cell C1 surface area in the X-Y plane (where X and Y directions are examples of first and second orthogonal directions, and the Z direction is considered the vertical direction). The first active region AR1 and the second active region AR2 may include semiconductors like silicon (Si) or germanium (Ge), or compound semiconductors such as silicon-germanium (SiGe), silicon carbide (SiC), gallium arsenide (GaAs), indium arsenide (InAs), or indium phosphide (InP). The first active region AR1 and the second active region AR2 may include conductive regions, for example, wells doped with impurities or structures doped with impurities.

The gate lines GLs are arranged on the first active region AR1 and the second active region AR2 and vertically overlap the first active region AR1 and the second active region AR2. The gate lines GLs, in conjunction with the semiconductor material in the first and second active regions AR1 and AR2, may form transistors. The first active region AR1 may form a p-channel metal-oxide-semiconductor (PMOS) transistor with each of the gate lines GLs, and the second active region AR2 may form an n-channel metal-oxide-semiconductor (NMOS) transistor with each of the gate lines GLs. The gate lines GLs may extend in the Y direction and be arranged, in the X direction, uniformly spaced from one another at a certain interval (DGL). The gate lines GLs may include metals like tungsten (W), tantalum (Ta), and so on, nitrides thereof, silicides thereof, or doped polysilicon.

As shown in FIG. 3B, the cell C1 may include wiring layers stacked in order in the Z direction (that is, a third, vertical direction), e.g., a first wiring layer M1, a second wiring layer M2, and a third wiring layer M3. Note that while three wiring layers are described, any suitable number of wiring layers may be provisioned. The cell C1 may include at least two wiring layers. The wiring layers may be formed from metals, conductive metal nitrides, metal silicides, or combinations thereof. For example, the first wiring layer M1, the second wiring layer M2, and the third wiring layer M3 may include conductive materials, for example, tungsten, molybdenum, titanium, cobalt, tantalum, nickel, tungsten silicide, titanium silicide, cobalt silicide, tantalum silicide, nickel silicide, and the like.

An internal wiring W1 that extends in the same direction as the gate lines GLs may be formed in a wiring layer or wiring layers. For example, in FIG. 3B, the internal wiring W1 may be formed in the third wiring layer M3, and this embodiment will be described hereinbelow. However, in other embodiments, the internal wiring W1 may be formed in the first wiring layer M1 or the second wiring layer M2.

The active regions ARs and the gate lines GLs may be included in the front-end layer (FEL). In addition, active contacts, gate contacts, and the like may also be included in the FEL. In an embodiment, a first via V0 and the first wiring layer M1 may be included in the FEL, and a second via V1, the second wiring layer M2, a third via V2, and the third wiring layer M3 may be included in the back-end layer (BEL).

Referring further to FIG. 3A, in routing operation S122 (see FIG. 1), routing tracks RTs may be provided, and routing wirings W2s used for routing (which may be referred to as just "routing wirings" hereinafter) may be formed, having the routing tracks RTs as a reference. The routing tracks RTs are virtual reference lines for routing and may be a reference for alignment of the routing wirings W2s. The routing tracks RTs may extend in the Y direction and may be uniformly spaced from one another at a certain interval DRT. The interval DRT between the routing tracks RTs may be less than the distance DGL between the gate lines GLs, and a distance between the routing wirings W2 may be set to be equal to or greater than the minimum distance according to the design rule. The routing wirings W2 may be placed in a predetermined pitch interval, having the routing tracks RTs as references. For example, in FIG. 3A, the routing wirings W2s may be arranged at a 3-pitch interval, having the routing tracks RTs as the references (where the 3-pitch interval equals 3×DRT).

Returning to FIG. 3B, the routing wirings W2s may be formed in the same layer as that of the internal wirings W1s, e.g., the third wiring layer M3. As the internal wirings W1s and the routing wirings W2s are formed in the same layer, the design rule may be applied to both the internal wirings W1s and the routing wirings W2s. A distance between an internal wiring W1 and a routing wiring W2 adjacent thereto may be designed equal to or greater than the minimum distance. For example, a distance between a first routing wiring W2_1 and a first internal wiring W1_1 and a distance between a second routing wiring W2_2 and a second internal wiring W1_2 may respectively be equal to or greater than the minimum distance.

Meanwhile, the internal wirings W1s are included within the standard cells and are placed during operation S121 (see FIG. 1) in which the standard cells are placed. As positions of the internal wirings W1s are fixed within the standard cells, the internal wirings W1s may not be aligned to the routing tracks RTs. On the other hand, as described above, the routing wirings W2s are aligned to the routing tracks RTs. Accordingly, there may be a case in which a distance between an internal wiring W1 and a routing wiring W2 adjacent thereto is initially less than the minimum distance. In this case, as shown in FIG. 3A, to adjust the distance between the internal wiring W1 and the routing wiring W2 adjacent thereto to be equal to or greater than the minimum distance, the operation S123 (see FIG. 1) of adjusting the layout of the placed cell by using the layout tool may be performed. Referring to following drawings, a method of adjusting the layout of the placed cells, according to example embodiments, will be described.

Figure 4A:
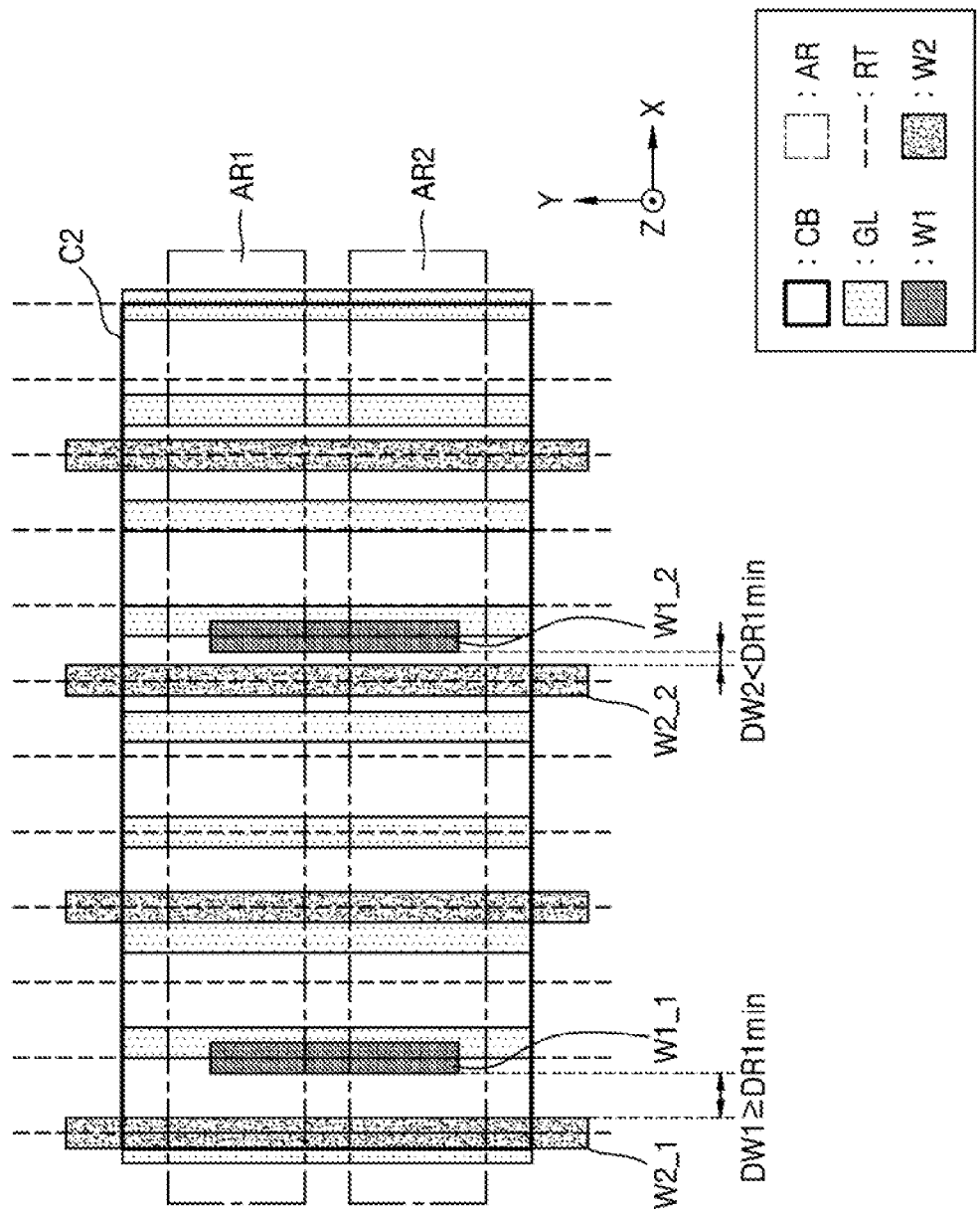
FIG. 4A shows a layout of an integrated circuit before a layout of the placed cells is adjusted.
Figure 4B:
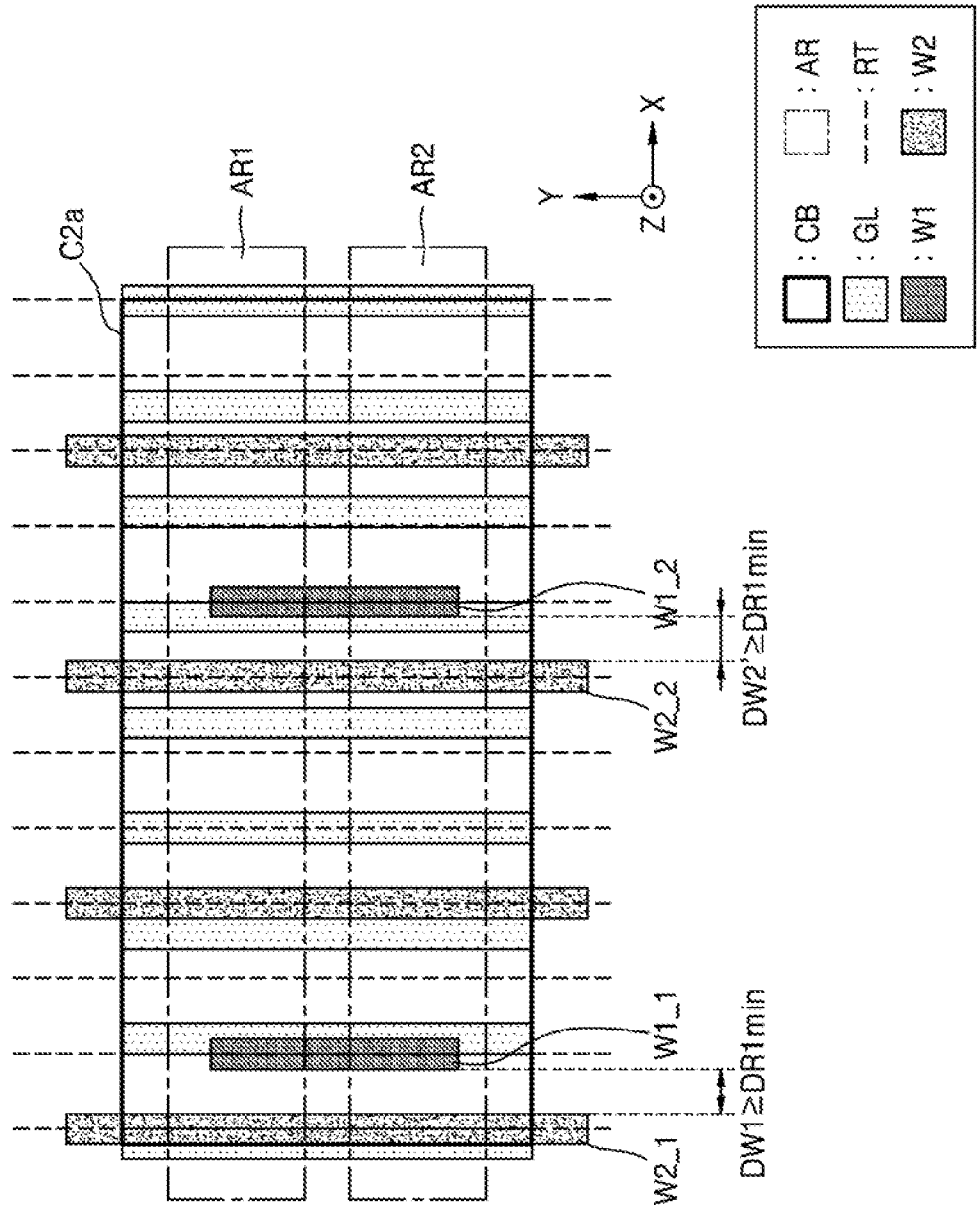
FIG. 4B shows a layout of an integrated circuit after the layout of the placed cells of FIG. 4A is adjusted.

FIG. 4A shows a layout of an integrated circuit before adjusting the layout of the placed cell. FIG. 4B, according to an example embodiment, shows a layout of an integrated circuit after adjusting the layout of the placed cell. In particular, FIG. 4A shows a layout of an integrated circuit 20 after the operations S121 and S122 of placing and routing the standard cells (see FIG. 1), and FIG. 4B shows a layout of an integrated circuit 20a after the operation S123 of adjusting of the layout of the placed cells.

In the layout of the integrated circuit 20, the cell C2 that has been arranged may include an internal wiring(s) W1, and a distance between the internal wiring W1 and a routing wiring W2 adjacent thereto may be less than a minimum distance DR1min. For example, in FIG. 4A, the cell C2 may include the first internal wiring W1_1 and the second internal wiring W1_2, and a distance DW1 between the first internal wiring W1_1 and the first routing wiring W2_1 may be equal to or greater than DR1min (e.g., DW1≥DR1min). However, a distance DW2 between the second internal wiring W1_2 and the second routing wiring W2_2 adjacent thereto may be less than DR1min.

The layout tool may adjust the layout of the cell C2 such that the distance DW2 between the second internal wiring W1_2 and the second routing wiring W2_2 adjacent thereto is equal to or greater than DR1min (e.g., DW2≥DR1min). More particularly, the layout tool may, in the X direction, adjust a position of the second internal wiring W1_2, based on a position of the second routing wiring W2_2. For example, the layout tool may adjust the location of the second internal wiring W1_2 such that the second internal wiring W1_2 is arranged further away from the second routing wiring W2_2. Accordingly, as shown in FIG. 4B, a layout of a cell C2a, in which a pattern of the internal wiring W1 is changed, may be formed. A distance DW2' between the second internal wiring W1_2 of the cell C2a and the second routing wiring W2_2 adjacent to the internal second wiring W1_2 may be equal to or greater than DR1min (e.g., DW2'≥DR1min).

In embodiments, as will be described later with reference to FIGS. 6A and 6B, the standard cell library may provide a plurality of cells respectively having different BELs for the same standard cell, and the layout tool may replace one of the cells C2 with another cell from among the plurality of cells corresponding to the same standard cell, thereby adjusting a layout of the cell C2. The BEL may include a layer in which both the internal wiring W1 and the routing wiring W2 are formed, for example, the third wiring layer M3 (see FIG. 3B). That is, the layout tool may adjust the layout of the cell C2 by selecting a cell and replacing the cell that may, as measured from the routing wiring W2, have a distance equal to or greater than the minimum distance of the design rule, from among the plurality of cells corresponding to the standard cell.

In an embodiment, as will be described later with reference to FIGS. 7A and 7B, the layout tool may, in the layout of the cell C2, adjust the layout of the cell C2 by shifting a position of the second internal wiring W1_2 (and a via connected thereto) in the X direction.

FIG. 5 shows a layout of an integrated circuit 20b, according to a comparative example. This layout is one in which the routing wirings have been adjusted according to a method of designing an integrated circuit according to a comparative method.

As shown in FIG. 5, according to the comparative method, when a distance between an internal wiring W1 and a routing wiring W2 adjacent thereto is less than the minimum distance DR1min, the routing wiring W2 adjacent to the at least one internal wiring W1 may be removed.

For example, when the distance between the second internal wiring W1_2 and the second routing wiring W2_2 is less than the minimum distance DR1min (e.g., see the distance DW2<DR1min in FIG. 4A), as shown in FIG. 5, the second routing wiring W2_2 may be eliminated. The layout of the cell C2 is not changed. Accordingly, a third routing wiring W2_3 becomes the closest routing wire to the second internal wiring W1_2, and a distance DW3 between the second internal wiring W1_2 and the third routing wiring W2_3 may be equal to or greater than the minimum distance DR1min, and thus it is possible to comply with the design rules. However, when routing is designed such that the routing tracks RTs are used at 3-pitch intervals, a routing track RT1 adjacent to the second internal wiring W1_2 is not used in the comparative example.

When the layout of the routing wiring W2 is adjusted as described above in the comparative example, the number of routing tracks RTs that are available decreases, and thus routing is not effectively performed. In addition, uniformity in pattern of the routing wiring W2 is degraded.

However, according to a method of designing the integrated circuit according to an embodiment of the inventive concept, by adjusting the layout of the cell that is placed based on the position of the routing wiring W2, e.g., the position of internal wiring W1 of the cell C2, the number of available routing tracks RTs may increase compared to the comparative example, and the pattern of the routing wiring W2 may be uniformly formed. The pattern of the routing wiring W2 may affect characteristics of the cells. For example, parasitic components such as parasitic capacitors and parasitic resistors due to the routing wirings W2s may affect the characteristics of the cells, and the parasitic components may be changed according to the pattern of the routing wirings W2s. According to a method of designing the integrated circuit according to an embodiment of the inventive concept, as the pattern of the routing wirings W2 is uniformly formed, the change in the characteristics of the cells may be reduced relative to the comparative method. Thus, deleterious effects of parasitic elements otherwise formed or otherwise having higher reactance/resistance due to nonuniform spacings of routing wirings, are lessened. In addition, as integrity of the routing wiring W2 is improved, a layout area of the integrated circuit may be reduced.

Figure 6A:
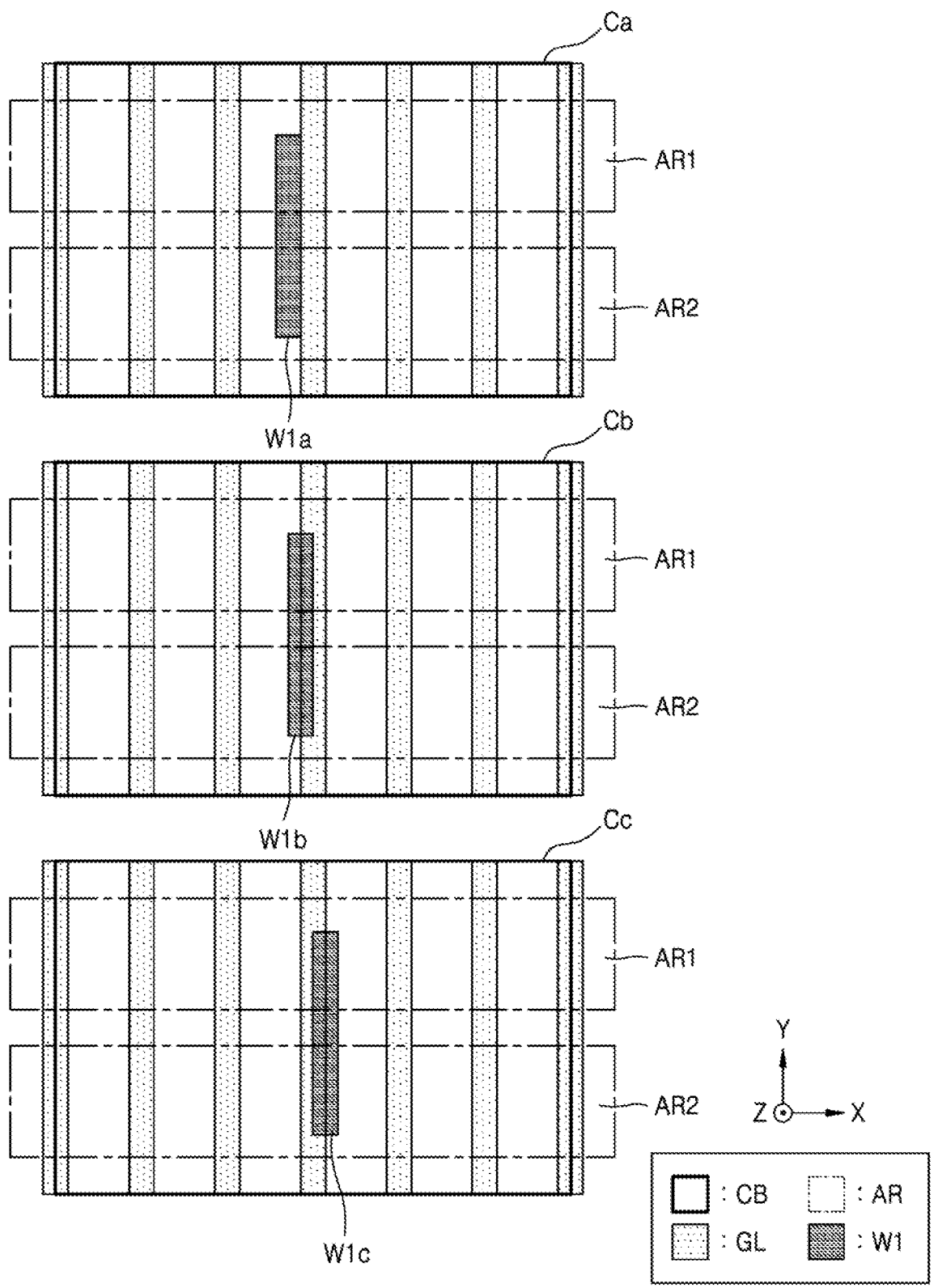
FIG. 6A shows a layout of a plurality of cells corresponding to the same standard cell according to an example embodiment.
Figure 6B:
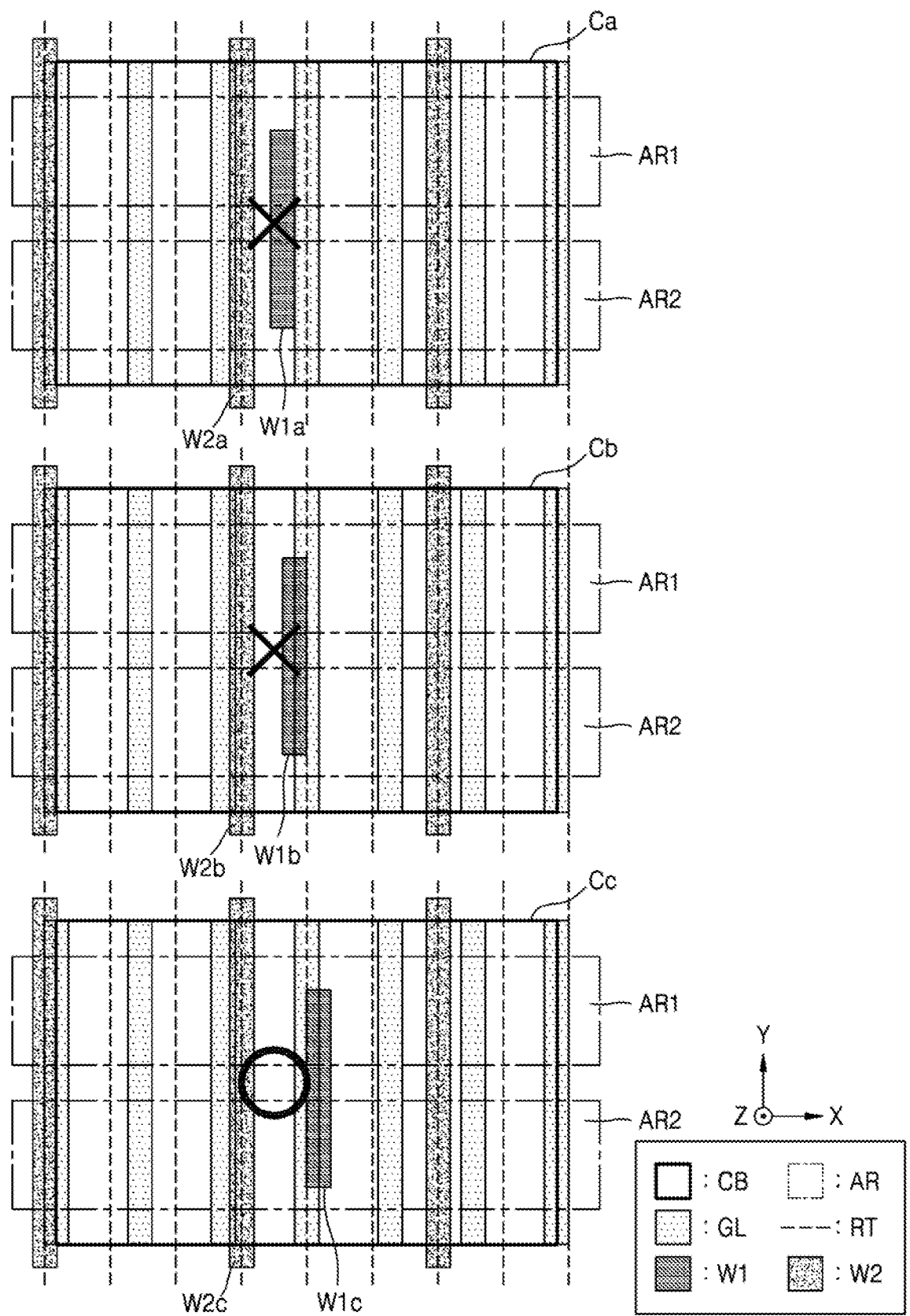
FIG. 6B shows a layout when the plurality of cells in FIG. 6A are arranged and routed in a same position of an integrated circuit.

FIG. 6A shows a layout of a plurality of cells corresponding to the same standard cell according to an example embodiment, and FIG. 6B shows a layout when the plurality of cells in FIG. 6A are arranged and routed in the same position of the integrated circuit. Below, a method of adjusting the layout of the cells in these figures, by replacing the placed cell with another cell according to an example embodiment, will be described.

Referring to FIG. 6A, the standard cell library may include a plurality of cells respectively having different layouts, for example, a first cell Ca, a second cell Cb, and a third cell Cc, with respect to one logic element, that is, the standard cell. In other examples, more or fewer than three cells are provided for the same standard cell (typically, at least two cells are provided).

The first cell Ca, the second cell Cb, and the third cell Cc correspond to the same standard cell, that is, one identical logic element, and the first cell Ca, the second cell Cb, and the third cell Cc have identical patterns of the FEL (for example, the active regions AR and the gate lines GLs) and different patterns of BEL (for example, the internal wiring W1). In the layout of the first cell Ca, the second cell Cb, and the third cell Cc, the internal wiring W1 may be placed in different positions in the X direction. For instance, in the layout, a first wiring W1b of the second cell Cb may be to the right of a first wiring W1a of the first cell Ca, and a first wiring W1c of the third cell Cc may be to the right of the first wiring W1b of the second cell Cb.

Referring to FIG. 6B, when the first cell Ca, the second cell Cb, and the third cell Cc are placed and routed in an identical region of the integrated circuit, distances between the internal wirings W1a, W1b, and W1c in the first cell Ca, the second cell Cb, and the third cell Cc and the routing wirings W2a, W2b, and W2c respectively adjacent to the internal wirings W1a, W1b, and W1c may be different from one another. For example, the distance between the first wiring W1a of the first cell Ca and the routing wiring W2a adjacent to the first wiring W1a may be less than the minimum distance based on the design rule. The distance between the first wiring W1b of the second cell Cb and the routing wiring W2b adjacent to the first wiring W1b may be less than the minimum distance based on the design rule. However, the distance between the first wiring W1c of the third cell Cc and the routing wiring W2c adjacent to the first wiring W1c may be equal to or greater than the minimum distance.

The layout tool may adjust a layout of the placed cells by arranging the third cell Cc in a manner that complies with the design rules. For example, when the first cell Ca is a default cell selected in a placement operation S121 (see FIG. 1), the layout tool may place the first cell Ca and perform routing thereon. Afterwards, the layout tool may adjust the layout of the placed cells by replacing the first cell Ca with the third cell Cc, in view of the position of the routing wiring W2 and the design rule.

Figure 7A:
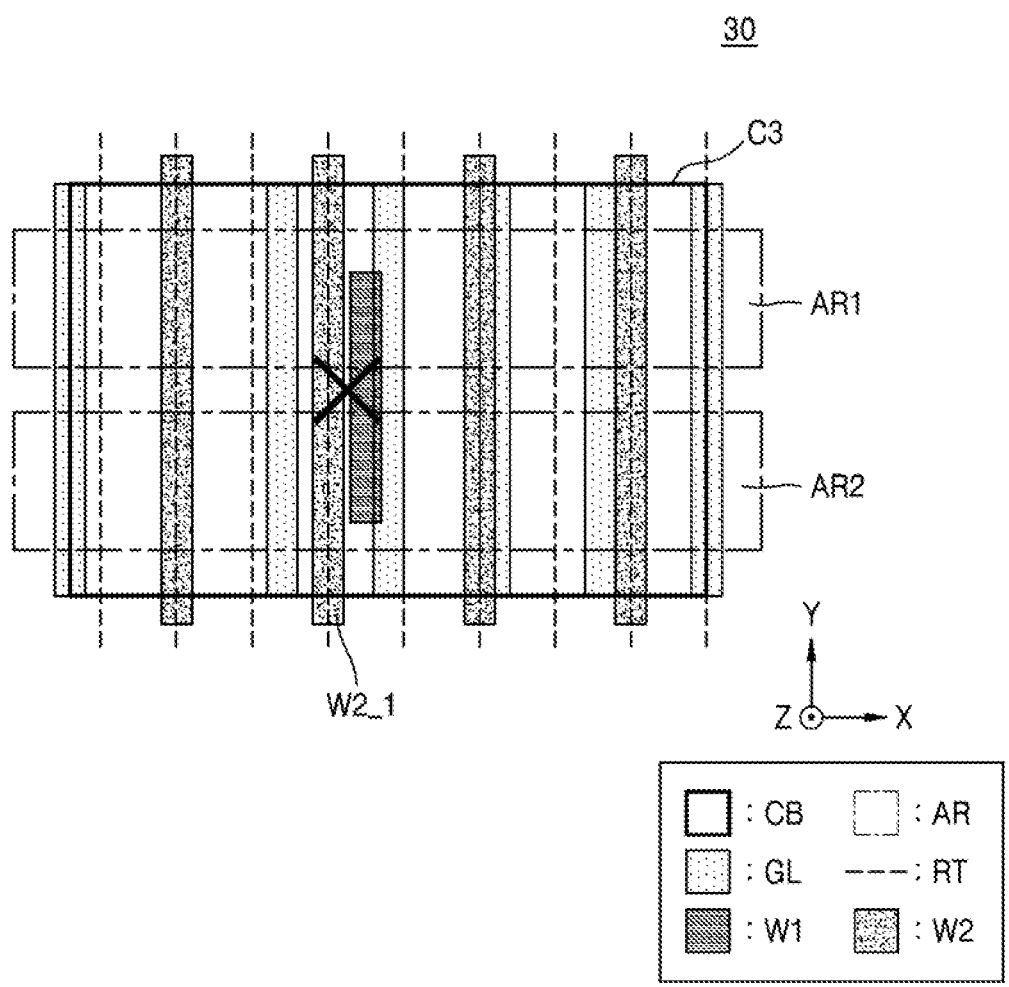
FIG. 7A shows a layout of an integrated circuit before a layout of placed cells are adjusted.
Figure 7B:
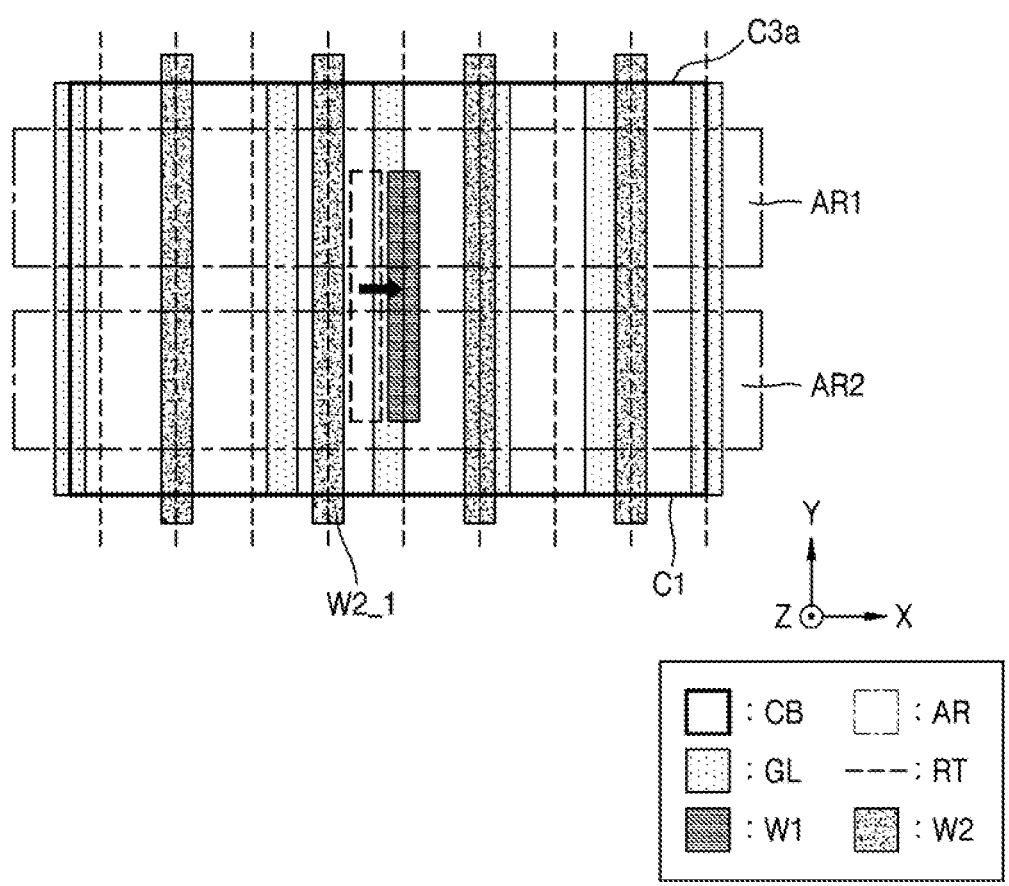
FIG. 7B shows a layout of the integrated circuit after adjusting positions of internal wirings, according to an example embodiment.

FIG. 7A shows a layout of an integrated circuit before adjusting the layout of the placed cells, and FIG. 7B shows the layout of the integrated circuit after adjusting locations of the internal wirings, according to an embodiment.

Referring to FIG. 7A, an integrated circuit 30 may include at least one cell C3 that includes the internal wiring W1. The routing wirings W2s may be aligned on the routing tracks RTs, for example, on every two pitches of the routing tracks RTs. A distance between the internal wiring W1 of the cell C3 and the routing wiring W2_1 adjacent to the internal wiring W1 may be less than the minimum distance according to the design rule, and thus, the layout of the integrated circuit 30 including the cell C3 may not comply with the design rules.

Referring to FIG. 7B, the internal wiring W1 of the cell C3 may be moved, and thus, a cell C3a having the internal wiring W1 with an adjusted position may be generated. For example, the layout tool may adjust the position of the internal wiring W1 by moving the internal wiring W1 in the X direction, based on the position of the routing wiring W2_1 adjacent to the internal wiring W1. The internal wiring W1 may be moved in the +X direction or in the −X direction. Based on the position of the routing wiring W2_1 adjacent to the internal wiring W1, the position of the internal wiring W1 may be shifted such that the distance between the internal wiring W1 and the routing wiring W2_1 adjacent thereto may be equal to or greater than the minimum distance.

Figure 8:
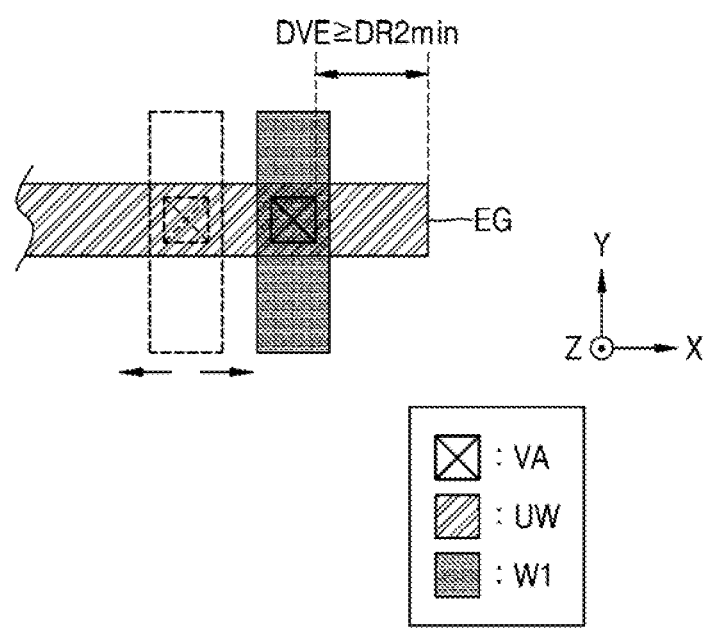
FIG. 8 shows an example of a layout of an integrated circuit according to an example embodiment.

FIG. 8 shows an example of a layout of an integrated circuit according to an embodiment. In a design approach, internal wirings W1s may be aligned on the routing tracks RTs. In this case, the positions of the internal wirings W1s, as shown in FIG. 8, may be shifted within a range according to the design rule.

In the example of FIG. 8, the internal wiring W1 may extend (longitudinally) in the Y direction, and an "under wiring" UW of the internal wiring W1 may extend (longitudinally) in the X direction. The under wiring UW may be formed in a lower wiring layer (e.g., the second wiring layer M2 shown in FIG. 3B) of a wiring layer (e.g., the third wiring layer M3 shown in FIG. 3B) in which the internal wiring W1 is formed. The internal wiring W1 and the under wiring UW may be electrically connected to each other through a via VA.

As described with reference to FIG. 7B, the internal wiring W1 may be shifted in the +X or −X direction, and the via VA that electrically connects the internal wiring W1 to the under wiring UW may be moved together with the internal wiring W1. In this case, the design rules may require that a distance DVE between the via VA and an edge EG of the under wiring UW, that is, an overlap margin between the via VA and the under wiring UW (hereinafter, referred to as an overlap margin), is equal to or greater than a minimum distance DR2min that is defined by the design rules with respect to the overlap margin. When the overlap margin is less than the minimum distance DR2min, a design rule error may occur in the verification operation S130 (see FIG. 1). Accordingly, to comply with the design rules, the internal wiring W1 and the via VA may be moved in a range in which the overlap margin is equal to or greater than the minimum distance DR2min.

Figure 9B:
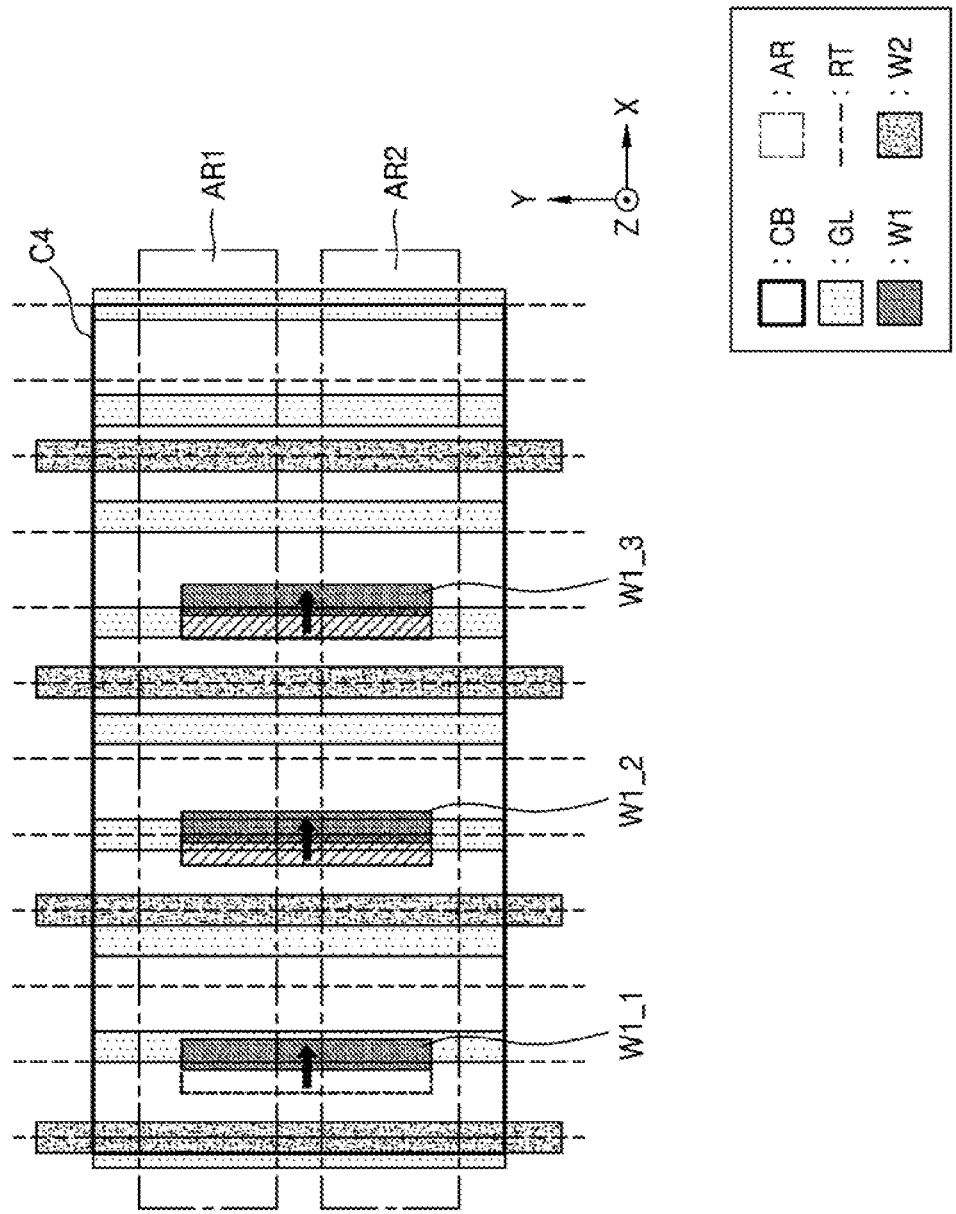
FIG. 9B shows an example of an adjustment of the layout in a placed cell in which the standard cell in FIG. 9A is placed.

FIG. 9A shows an example of a layout of a standard cell according to an example embodiment, and FIG. 9B shows an example of an adjustment of the layout of a placement cell in which the standard cell in FIG. 9A is placed.

Referring to FIG. 9A, a standard cell SC4 may include a plurality of internal wirings W1s, and the internal wirings W1s may be arranged at an interval of N times (N is an integer) a distance DRT between routing tracks RT (shown in FIG. 9B). For example, as shown in FIG. 9A, the standard cell SC4 may include the first internal wiring W1_1, the second internal wiring W1_2, and a third internal wiring W1_3, and each of distances DWs between the first internal wiring W1_1, the second internal wiring W1_2, and the third internal wiring W1_3 may be N times the distance DRT between the routing tracks RTs.

Referring to FIG. 9B, an adjustment is made to the layout of standard cell SC4 of FIG. 9A, to arrive at a placed cell C4, which is routed. Here, the routing wirings W2s, after adjustment, may be aligned on the routing tracks RTs, and the distances between the first internal wiring W1_1, the second internal wiring W1_2, and the third internal wiring W1_3 (hereafter, just "W1_1 to W1_3") may be identical to one another. In this case, when each of the distances between W1_1 to W1_3 and the routing wirings W2s adjacent to W1_1 to W1_3 is less than the minimum distance based on the design rule, the layout tool may simultaneously adjust the positions of W1_1 to W1_3 to comply with the design rule.

In the embodiment, the layout tool may adjust the positions of W1_1 to W1_3 in the placed standard cell C4, by shifting the positions of W1_1 to W1_3 at a uniform interval in the +X or −X direction.

In the embodiment described with reference to FIGS. 6A and 6B, the standard cell library may, with respect to the same standard cell, provide the plurality of cells having different positions of W1_1 to W1_3 from cell to cell (e.g. from cell Ca to cell Cc, although just the first internal wiring such as W1a in any of the cells is shown). In addition, when the distances between the internal wirings of the cells and the routing wirings do not meet the minimum distance, the layout tool may adjust the positions of W1_1 to W1_3 by replacing the cell, which is selected from among the plurality of cells and placed as the cell C4, with another cell from among the plurality of cells. As described above, according to the example embodiment of FIGS. 9A and 9B, as the internal wirings W1s of the cell C4 are all shifted at a uniform interval, the characteristic change of the cell C4 may be minimized.

As described above with reference to FIGS. 3A through 9B, according to the method of designing the integrated circuit according to the embodiments, by adjusting the positions of the internal wirings of the cell in view of the position of the wirings used for routing, space for the routing wirings may be increased, and the routing wirings may be formed at a uniform interval. Accordingly, an area of the integrated circuit may be reduced, and the characteristic change in the cell may also be reduced.

Figure 10:
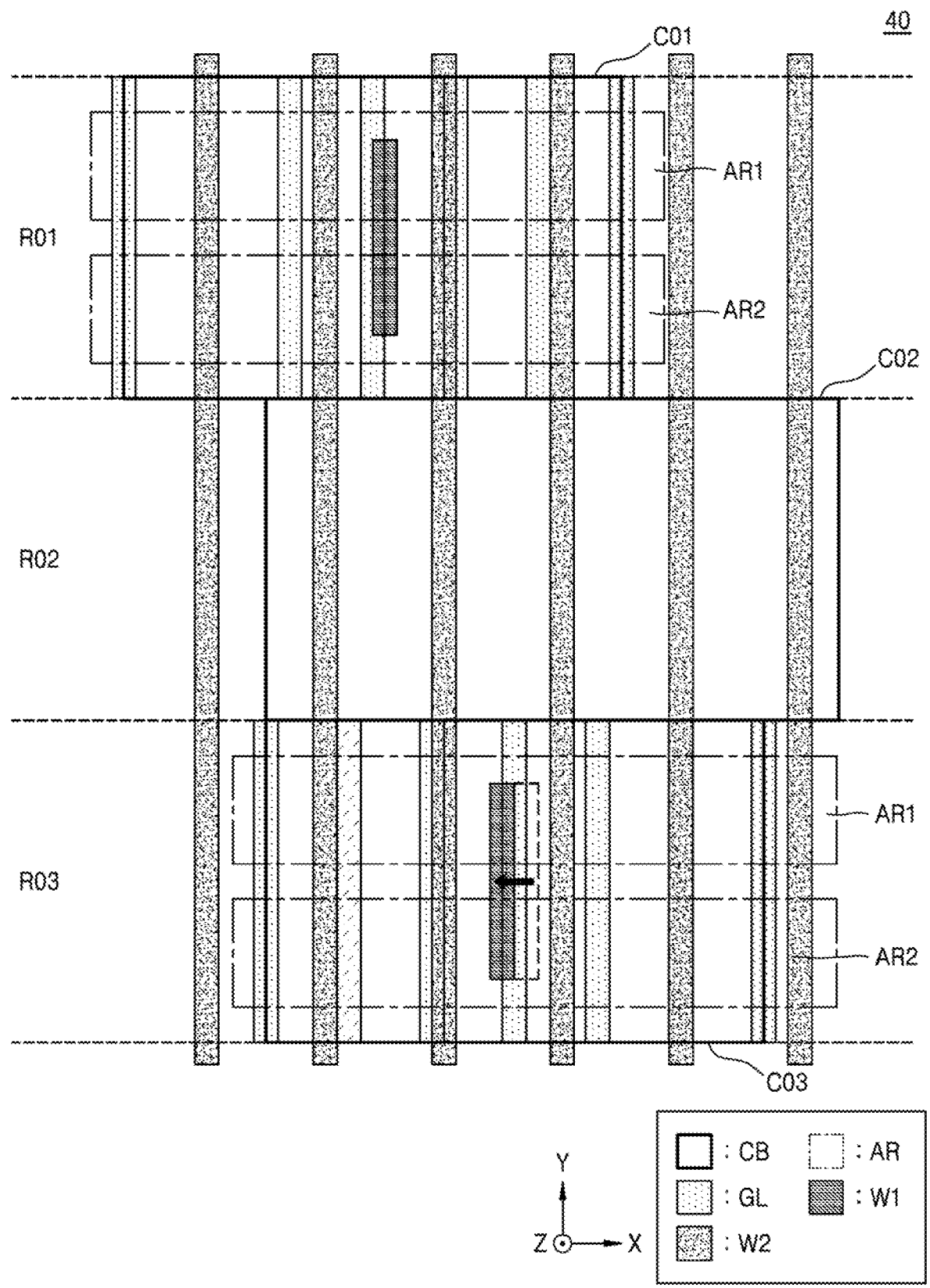
FIG. 10 shows an example of a layout of an integrated circuit, according to an example embodiment.

FIG. 10 shows an example of a layout of an integrated circuit 40, according to an example embodiment. Integrated circuit 40 may include a plurality of cells C01, C02, and C03. Cells C01, C02, and C03 may be instances of standard cells. Based on physical characteristics, for example, functions, timing, characteristics, and the like, of the standard cells, a standard cell that is to be included in the integrated circuit 40 may be selected from the cell library including information regarding the standard cells, and as an instance of the selected standard cell is placed, the layout of the integrated circuit 40 may be formed.

Cells C01, C02, and C03 may be arranged in a plurality of rows R01 through R03. Each of rows R01 through R03 may have a height that is identical to a minimum height of the standard cell. In FIG. 10, the integrated circuit 40 is illustrated as including "single height" cells that have heights, that is, lengths in a Y direction, equal to heights of the individual rows R01 through R03. However, the integrated circuit 40 is not limited thereto and may further include "multi-height" cells having heights that are identical to several times the heights of rows R01 through R03.

In this example, the first cell C01 and the third cell C03 may be instances of an identical standard cell. In the embodiment, the standard cell may be a multi-bit flip-flop that will be described with reference to FIGS. 11 through 13. As the instances of the standard cells are arranged in different rows, that is, the first row R01 and the third row R03, the first cell C01 and the third cell C03 may be formed.

The first cell C01 and the third cell C03 may have the same widths, that is, lengths in the X direction, and the same heights. In addition, patterns of FELs of the first cell C01 and the third cell C03 may be identical to each other. For example, the first cell C01 and the third cell C03 may have identical patterns of active regions ARs and gate lines GLs.

However, as described above, as the position of the internal wiring W1 is adjusted based on the position of the routing wiring W2, the first cell C01 and the third cell C03 may respectively have different patterns of the BEL, that is, different patterns of the internal wiring W1, or the internal wiring W1 and the via VA connected thereto may respectively have different patterns. Accordingly, the relative position of the internal wiring W1 in the X direction in the first cell C01 may be different from the relative position of the internal wiring W1 in the X direction in the third cell C03. In this case, the internal wirings W1s may be wirings that are formed within a cell boundary CB and extending in the Y direction, like the gate lines GLs. In each of the first cell C01 and the third cell C03, the internal wiring W1 may be a part of connection lines to electrically connect nodes in the cell.

Figure 11:
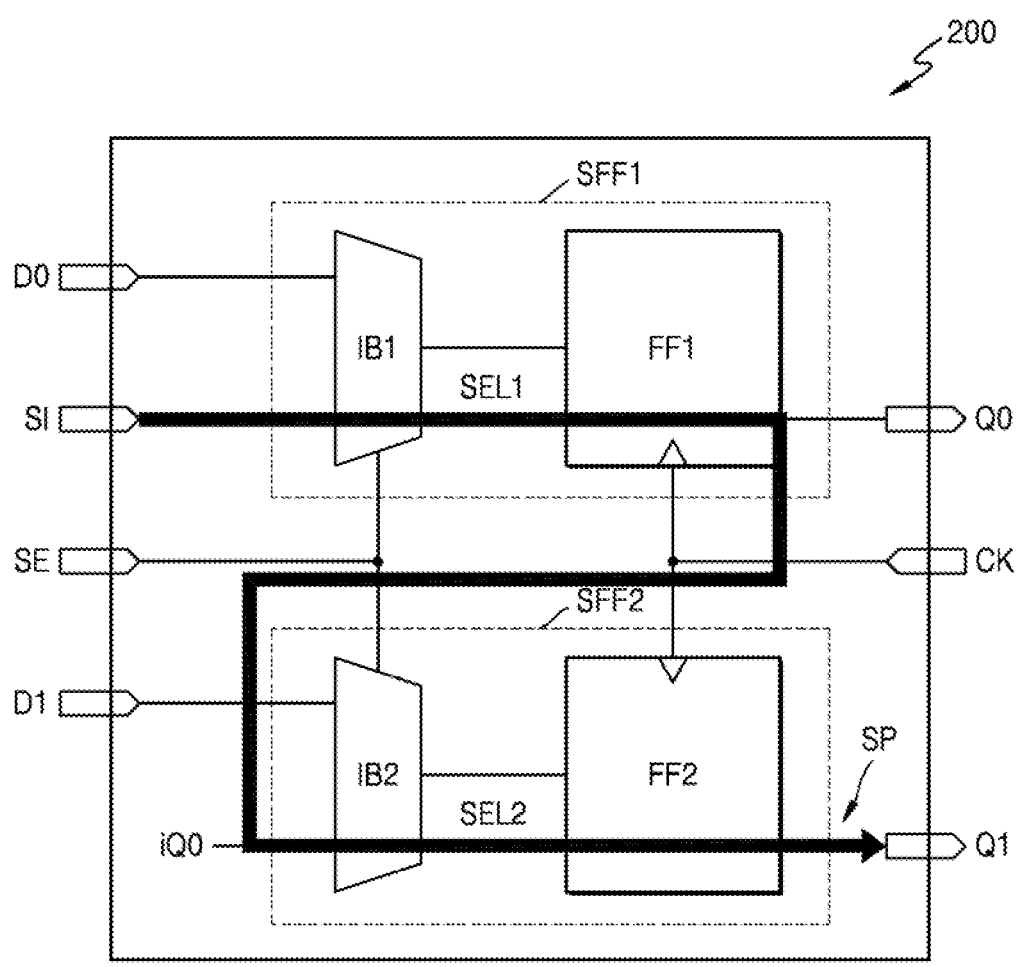
FIG. 11 is a block diagram showing a multi-bit flip-flop according to an example embodiment.

FIG. 11 is a block diagram showing a multi-bit flip-flop 200, according to an example embodiment. Multi-bit flip-flop 200 may include a first scan flip-flop SFF1 and a second scan flip-flop SFF2 and may be implemented as a single cell. In other embodiments, multi-bit flip-flop 200 may be implemented as a single cell including at least three scan flip-flops.

The multi-bit flip-flop 200 may receive a first data input signal D0 and a second data input signal D1, a scan input signal SI, a scan enable signal SE, and a clock signal CK via input terminals (or input pins), and may output a first output signal Q0 and a second output signal Q1 via output terminals (or output pins).

The first scan flip-flop SFF1 may include a first input block IB1 and a first flip-flop FF1. The first input block IB1 may receive the first data input signal D0 and the scan input signal SI, and may, in response to the scan enable signal SE, select one of the first data input signal D0 and the scan input signal S1 as a first selection signal SELL. The first flip-flop FF1 may receive the first selection signal SEL1, and may, in response to the clock signal CK, latch the first selection signal SEL1 and provide the first output signal Q0.

The second scan flip-flop SFF may include a second input block IB2 and a second flip-flop FF2. The second input block IB2 may receive a second data input signal D1 and an internal signal iQ0, and may, in response to the scan enable signal SE, select one of the second data input signal D1 and the internal signal iQ0 as a second selection signal SEL2. The second flip-flop FF2 may receive the second selection signal SEL2, and may, in response to the clock signal CK, latch the second signal SEL2 and provide the second output signal Q1.

In an embodiment, the internal signal iQ0 may be a signal generated by mirroring the first output signal Q0. The internal signal iQ0 may have the same logic level as that of the first output signal Q0, or alternatively, an inverse logic level with respect to the first output signal Q0.

When the scan enable signal SE instructs a normal operation mode, that is, when the scan enable signal SE has a first logic level, the first input block IB1 may select the first data input signal D0 as the first selection signal SEL1, and the first flip-flop FF1 may latch the first selection signal SEL1 and provide the first output signal Q0. In addition, the second input block IB2 may select the second data input signal D1 as the second selection signal SEL2, and the second flip-flop FF2 may latch the second selection signal SEL2 and provide the second output signal Q1.

When the scan enable signal SE instructs a scan test mode, that is, when the scan enable signal SE has a second logic level, as shown in FIG. 11, a scan path SP may be generated in the multi-bit flip-flop 200. The first input block IB1 may select the scan input signal SI as the first selection signal SEL1, and the first flip-flop FF1 may latch the first selection signal SEL1 and provide the first output signal Q0. In an embodiment, the first flip-flop FF1 may generate the internal signal iQ0 that is generated by mirroring the first output signal Q0, and provide the generated internal signal iQ0 as the scan input signal SI to the second input block IB2. In addition, the second input block IB2 may select the internal signal iQ0 as the second selection signal SEL2, and the second flip-flop FF2 may latch the second selection signal SEL2 and provide the second output signal Q1.

A scan path SP may be formed by connecting a scan path of the first scan flip-flop SFF 1 and a scan path of the second flip-flop SFF to each other. The multi-bit flip-flop 200 may be operated similarly to a scan chain that includes a plurality of scan flip-flops respectively implemented as a plurality of cells. With multi-bit flip-flop 200, a cell area may be reduced compared to a case in which the plurality of scan flip-flops are implemented as a plurality of cells that form a scan chain by means of the cells being connected to one another. As the scan path of the first scan flip-flop SFF1 and the scan path of the second scan flip-flop SFF2 are connected to each other in the multi-bit flip-flop 200, there is no requirement for an extra circuit (for example, a buffer) to receive the first output signal Q0 as a scan input of the second scan flip-flop SFF2, and thus, a cell area may be reduced.

Figure 12A:
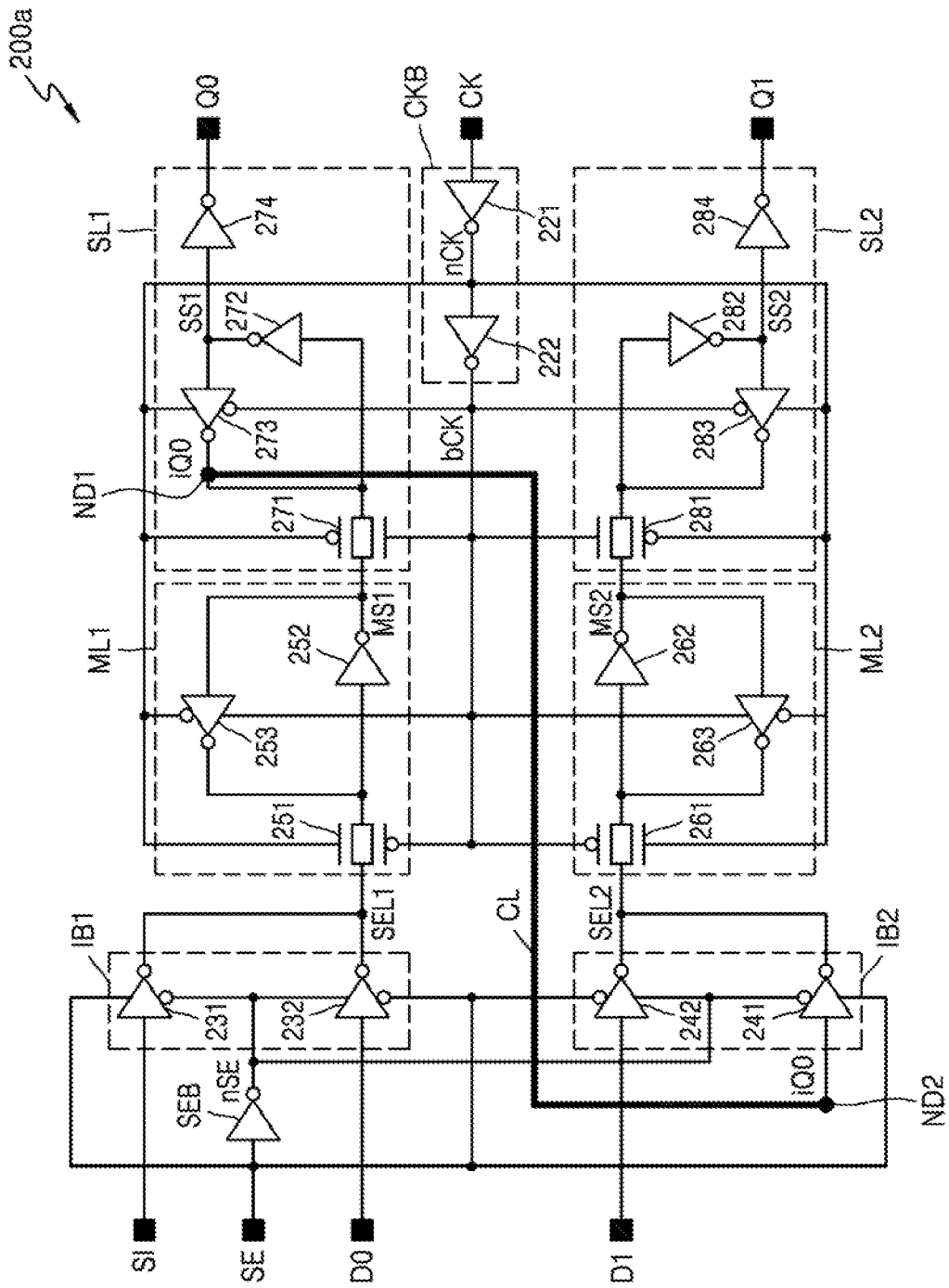
FIG. 12A is a circuit diagram showing an embodiment of a multi bit flip-flop.
Figure 12B:
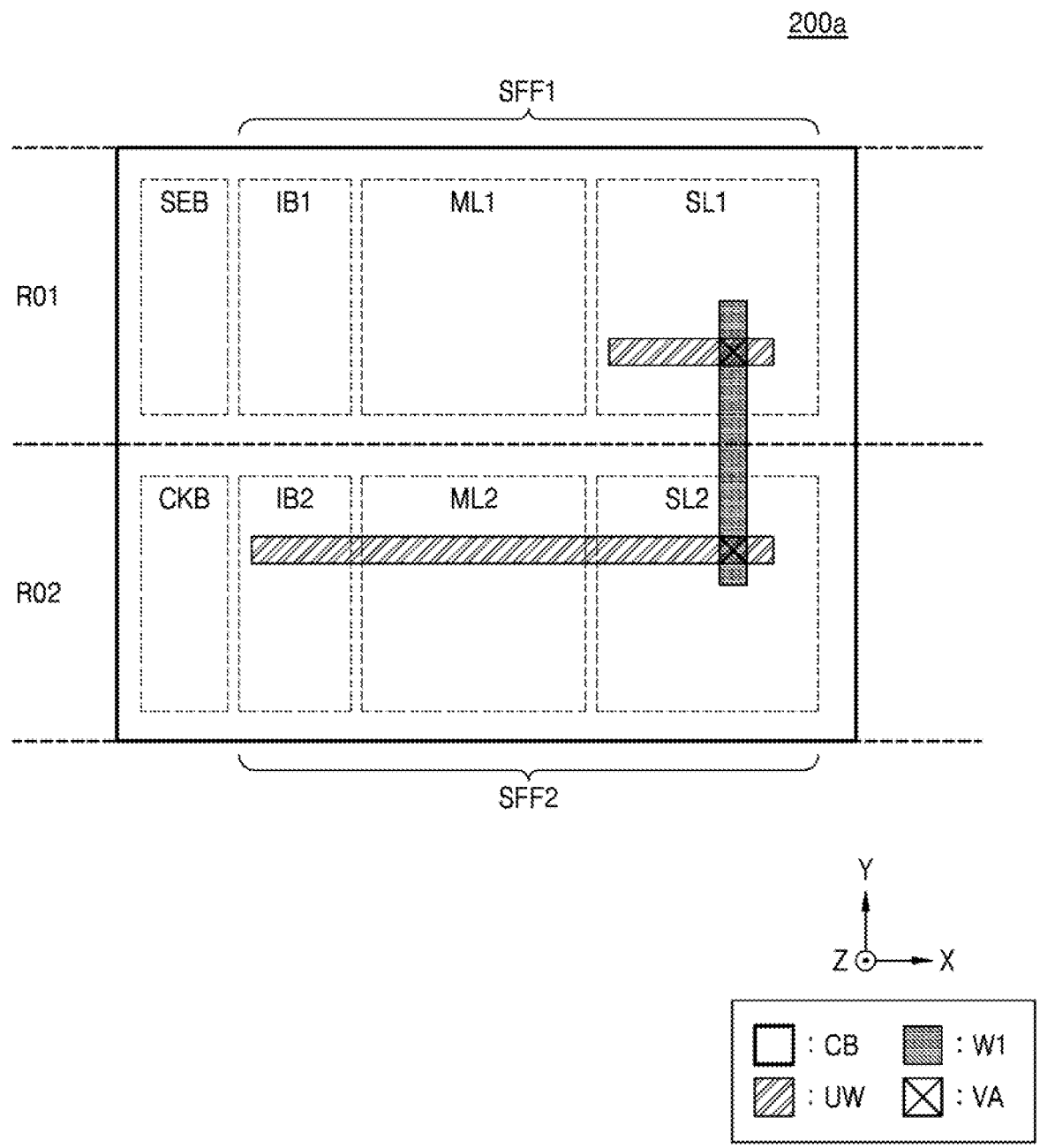
FIG. 12B is an example layout of the multi bit flip-flop.

FIG. 12A is a circuit diagram showing an embodiment of a multi-bit flip-flop 200a according to an example embodiment. FIG. 12B shows an example layout of the multi-bit flip-flop 200a according to an example embodiment. Multi-bit flip-flop 200a is one example of multi-bit flip-flop 200 described above.

As shown in FIG. 12A, the multi-bit flip-flop 200a may include a first input block IB1 and a second input block IB2, a first master latch ML1 and a second master latch ML2, and a first slave latch SL1 and a second slave latch SL2. For example, the first input block IB1, the first master latch ML1, and the first slave latch SL1 may be included in the first scan flip-flop SFF1 of FIG. 11, and the second input block IB2, the second master latch ML2, and the second slave latch SL2 may be included in the second scan flip-flop SFF2 of FIG. 11. In addition, the multi-bit flip-flop 200 may further include a scan enable buffer SEB for buffering (or buffering and phase inversion) of the scan enable signal SE, and a clock buffer CKB for buffering and phase-shifting of the clock signal CK.

The scan enable buffer SEB may receive the scan enable signal SE, buffer the received scan enable signal SE, and provide a negation scan enable signal nSE. The clock buffer CKB may receive the clock signal CK, buffer the received clock signal CK, and provide a negation clock signal nCK and a buffered clock signal bCK.

The first input block IB1 may include a first input tri-state inverter 231 and a second input tri-state inverter 232. In response to the scan enable signal SE and the negation scan enable signal nSE, a signal generated by inverting the scan input signal SI by using the first input tri-state inverter 231 may be output as the first selection signal SEL1, or a signal generated by inverting the first data input signal D0 by using the second input tri-state inverter 232 may be output as the first selection signal SEL1.

The first master latch ML1 may include a first transmission gate 251, a first inverter 252, and a first tri-state inverter 253. The first transmission gate 251 may transmit the first selection signal SEL1 to the first inverter 252, based on the clock signal CK, more particularly, the negation clock signal nCK and the buffered clock signal bCK. The first inverter 252 may invert the first selection signal SEL1 and provide a first master signal MS1. The first tri-state inverter 253 may receive the first master signal MS1, and may, based on the clock signal CK, output a signal that is generated by inverting the first master signal MS1.

The first slave latch SL1 may include a second transmission gate 271, a second inverter 272, a second tri-state inverter 273 and a third inverter 274. The second transmission gate 271 may, based on the clock signal CK, transmit the first master signal MS1 to the second inverter 272. The second inverter 272 may provide a first slave signal SS1 by inverting the first master signal MS1 that is transmitted from the second transmission gate 271. The second tri-state inverter 273 may receive the first slave signal SS1, and may, based on the clock signal CK, output a signal that is generated by inverting the first slave signal SS1. The third inverter 274 may invert the first slave signal SS1 and output the first output signal Q0.

With multi-bit flip flop 200*a*, the output of the second tri-state inverter 273 may have a logic level that is the same as the output of the third inverter 274, that is, the first output signal Q0. Accordingly, the output signal iQ0 of the second tri-state inverter 273 may be a signal that is generated by mirroring the first output signal Q0. The output signal iQ0 of the second tri-state inverter 273 may be fed back to become the internal signal iQ0, which is understood to correspond to the first output signal Q0. However, the internal signal iQ0 may alternatively be generated in other ways. For instance, a signal derived from the first output signal Q0 via an even number of inverters, or the output of the second inverter 272, that is, the first slave signal SS1, may alternatively be used as the internal signal iQ0.

As configurations and operations of the second input block IB2, the second master latch ML2, and the second slave latch SL2 are similar to those of the first input block IB1, the first master latch ML1, and the first slave latch SL1, redundant descriptions thereof will be omitted.

With multi-bit flip flop 200*a*, the internal signal iQ0 may be used as the scan input signal SI that is applied to the second input block IB2. Accordingly, a scan path of the first input block IB1, the first master latch ML1, and the first slave latch SL1 and a scan path of the second input block IB2, the second master latch ML2, and the second slave latch SL2 may be connected to each other. A first node ND1 of the first slave latch SL1 may be connected to a second node ND2 of the second input block IB2 via a connection line CL, and through the connection line CL, the internal signal iQ0 may be applied to the second input block IB2.

Referring to FIG. 12B, a multi-bit flip-flop 200*a* may be aligned and placed in a plurality of rows of an IC layout, for example, a first row R01 and a second row R02. In this case, the first scan flip-flop SFF1 and the second scan flip-flop SFF2 may respectively be placed in different rows. For example, the first scan flip-flop SFF1 may be placed in the first row R01, and the second scan flip-flop SFF2 may be placed in the second row R02. In addition, the scan enable buffer SEB and the clock buffer CKB may respectively be placed in the first row R01 and the second row R02.

In this embodiment, the internal wiring W1 may be formed to connect the node of the first scan flip-flop SFF1 to an internal node of the second scan flip-flop SFF2. For example, as described above with reference to FIG. 12A, the internal signal iQ0 generated in the first slave latch SL1 may be applied to the second input block IB2 via the connection line CL, and the internal wiring W1 may be formed as a part of the connection line CL. As shown in FIG. 12B, the internal wiring, the under wiring UW of the internal wiring, and the via VA may form the connection line CL.

As described above with reference to FIG. 10, after the instances of the multi-bit flip-flop 200 are placed and routed, the position of the internal wiring W1 of each of the instances, that is, the position in the X direction, may be adjusted based on the position of the routing wiring adjacent to the internal wiring W1. Accordingly, the instances of the multi-bit flip-flop 200*a* formed in the integrated circuit may have different positions of the internal wirings W1*s*.

Figure 13:
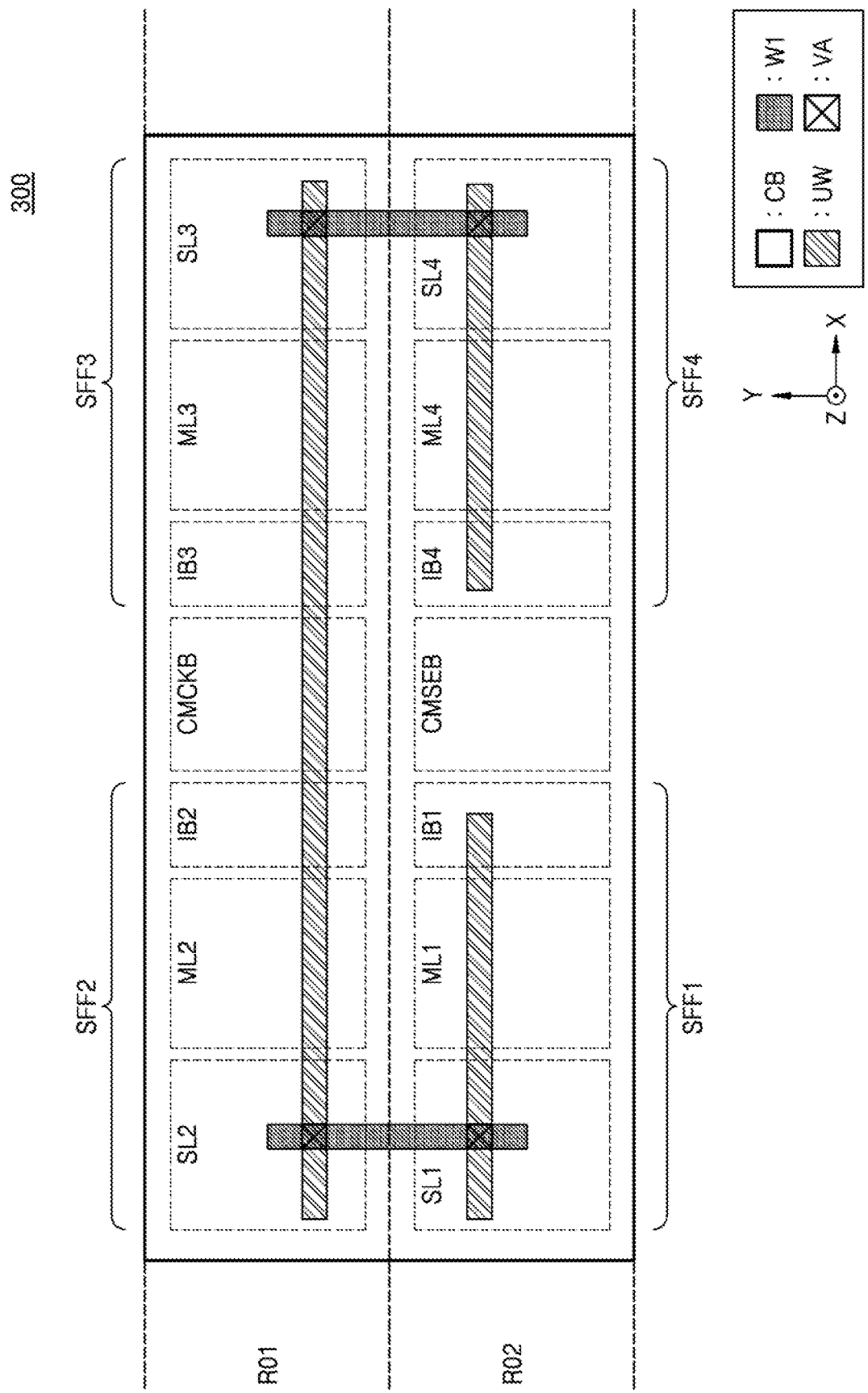
FIG. 13 is a layout showing an embodiment of a multi bit flip-flop.

FIG. 13 is an example layout of a multi-bit flip-flop 300, according to an example embodiment. Multi-bit flip-flop 300 may include a first scan flip-flop SFF1, a second scan flip-flop SFF2, a third scan flip-flop SFF3, and a fourth scan flip-flop SFF4. In other words, the multi-bit flip-flop 300 may be a four-bit flip-flop. The first scan flip-flop SFF1 and the fourth scan flip-flop SFF4 may be arranged in an identical row, for example, the first row R01, and the second scan flip-flop SFF2 and the third scan flip-flop SFF3 may be arranged in another, identical row, for example, the second row R02. A common scan enable buffer CMSEB and a common clock buffer CMCKB respectively providing the scan enable signal (or the negation scan enable signal) and the clock signal (or the negation clock signal) for the first scan flip-flop SFF1, the second scan flip-flop SFF2, the third scan flip-flop SFF3, and the fourth scan flip-flop SFF4 may, in a central point of the layout of the multi-bit flip-flop 300, respectively be formed in the first row R01 and the second row R02.

The internal wiring W1 may be formed to connect internal nodes of the first scan flip-flop SFF1, the second scan flip-flop SFF2, the third scan flip-flop SFF3, and the fourth scan flip-flop SFF4 to one another. The first internal wiring W1_1 is formed as a part of a connection line that connects the internal nodes of the first scan flip-flop SFF1 to the second scan flip-flop SFF2, and the second internal wiring W1_2 may be formed as a part of a connection line that connects the internal nodes of the third scan flip-flop SFF3 to the fourth scan flip-flop SFF4.

As described above with reference to FIG. 10, after the instances of the multi-bit flip-flop 300*a* are placed and routed, the positions of the internal wirings W1*s* of the instances, that is, the positions along the X axis, may be adjusted based on the positions of the routing wirings W2*s* adjacent to the internal wirings W1*s*. Accordingly, the instances of the multi-bit flip-flop 300*a* formed in the integrated circuit may have different positions of the internal wirings W1*s*.

Figure 14:
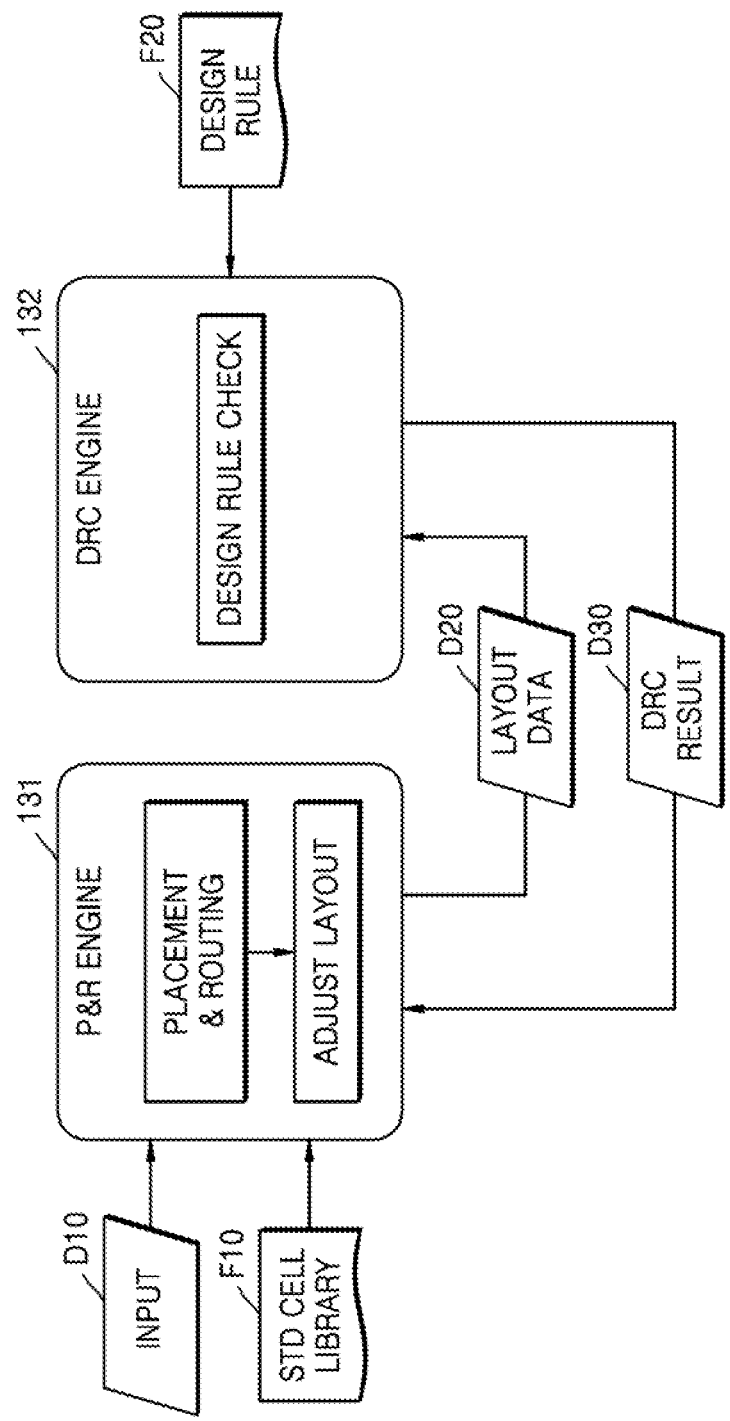
FIG. 14 is a block diagram showing a placement & routing (P&R) engine and a design rule check (DRC) engine, according to an example embodiment.

FIG. 14 is a block diagram showing a placement & routing (P&R) engine 131, and a design rule check (DRC) engine 132, according to an example embodiment. P&R engine 131 may be a first processing circuit executing a program that produces layout data in the integrated circuit, and may correspond to an example of the P&R module 130*b* stored in the memory 130 of FIG. 2. DRC engine 132 may be a second processing circuit executing a program that performs DRC on the layout data of the integrated circuit, and may, correspond to an example of a DRC module 130*c* stored in the memory 130 of FIG. 2. (The first and second processing circuits may be part of the same processor or may be implemented by different respective processors.) Programs corresponding to the P&R engine 131 and the DRC engine 132 may include a plurality of procedures which may be referred to as a series of instructions to perform certain tasks. The procedures may be functions, routines, subroutines, and/or subprograms. Each procedure may process data provided from an external source or data produced by other procedures.

The P&R engine 131 may produce layout data D20 with reference to the standard cell library F10, based on input data D10, for example, netlist data. The P&R engine 131 may, based on the netlist data, place and route the standard cells. The P&R engine 131 may also adjust a layout of the placed cells. The P&R engine 131 may, based on the position of the routing wiring, adjust the positions of the internal wirings of the placed cells that are formed in the same layer as that of the routing wirings. The P&R engine 131 may adjust the layout of the placed cells with reference to a design rule F20 or adjust the layout of the placed cells based on a DRC result D30 that is provided from the DRC engine 132.

The DRC engine 132 may check the design rule and produce a design rule check result D30, based on the layout data D20 produced in the P&R engine 131 and the design rule F20. When the DRC result D30 includes a design rule error, the P&R engine 131 may repeat at least one of placing and routing, and adjusting the layout of the placed cells. For example, the DRC result D30 may include an error related to the minimum distance between the routing wiring and the internal wiring, and the P&R engine 131 may, based on the DRC result D30, adjust the layout of the placed cells.

Figure 15:
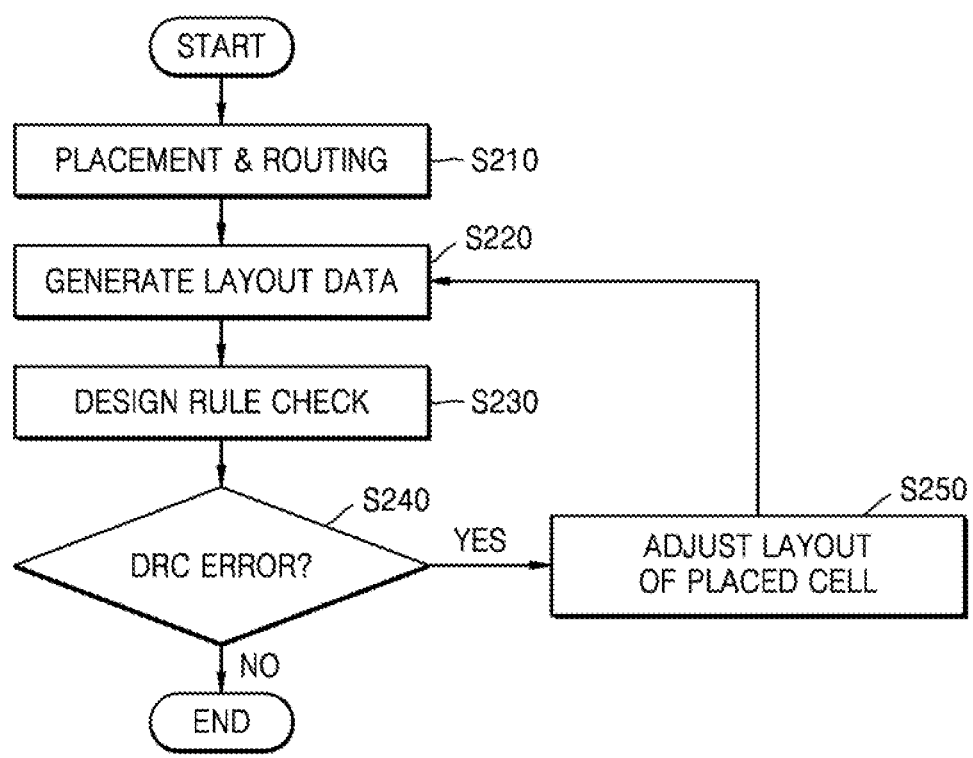
FIG. 15 is a flowchart schematically showing a method of designing an integrated circuit, according to an example embodiment.

FIG. 15 is a flowchart schematically showing a method of designing an integrated circuit, according to an example embodiment. The method of designing the integrated circuit described in FIG. 15 is, in detail, a method of designing a layout of the integrated circuit, and may be performed by using the P&R engine 131 and the DRC engine 132 shown in FIG. 14. Therefore, FIG. 15 will be described with reference to FIG. 14.

In operation S210, the P&R engine 131 may, based upon the input data D10, that is, the netlist data, place and route standard cells that are provided from the standard cell library F10.

In operation S220, the P&R engine 131 may, based on a layout formed in the operation S210, produce layout data regarding the integrated circuit. The layout data may include topological data that is used to define a structure of the integrated circuit that is fabricated in a semiconductor fabrication process.

In operation S230, the DRC engine 132 may, based on the design rule F20, perform design rule check on the layout data D20. The DRC engine 132 may produce the DRC result D30.

In operation S240, the DRC engine 132 may determine whether there is a design rule error. The DRC engine 132 may, based on the DRC result D30, determine whether there is a design rule error.

When there is a design rule error, more particularly, a design rule error in the distance between the routing wiring and the internal wiring, in operation S250, the layout of the cell in which the P&R engine 131 is placed may be adjusted. The P&R engine 131 may, based on the position of the routing wiring, adjust the position of the internal wiring of the placed cell that is formed in the same layer as that of the routing wiring. The P&R engine 131 may, as described with reference to FIGS. 6A and 6B, replace the placed cell with another cell corresponding to the same standard cell, or may, as described with reference to FIGS. 7A and 7B, shift the internal wiring of the placed cell.

Afterwards, the operation S220, the operation S230, and the operation S240 may be repeated. The P&R engine 131 may reproduce the layout data, and the DRC engine 132 may perform the design rule check, based on the reproduced layout data, and determine whether there is a design rule error. In the embodiment, the DRC engine 132 may perform the design rule check with respect to some regions in which the design rule error has previously occurred (that is, some cells in which the design rule error has previously occurred). When there is no design rule error, the layout design of the integrated circuit may be finished. Otherwise, when there is a design rule error, the operation S250 may be repeated.

Figure 16:
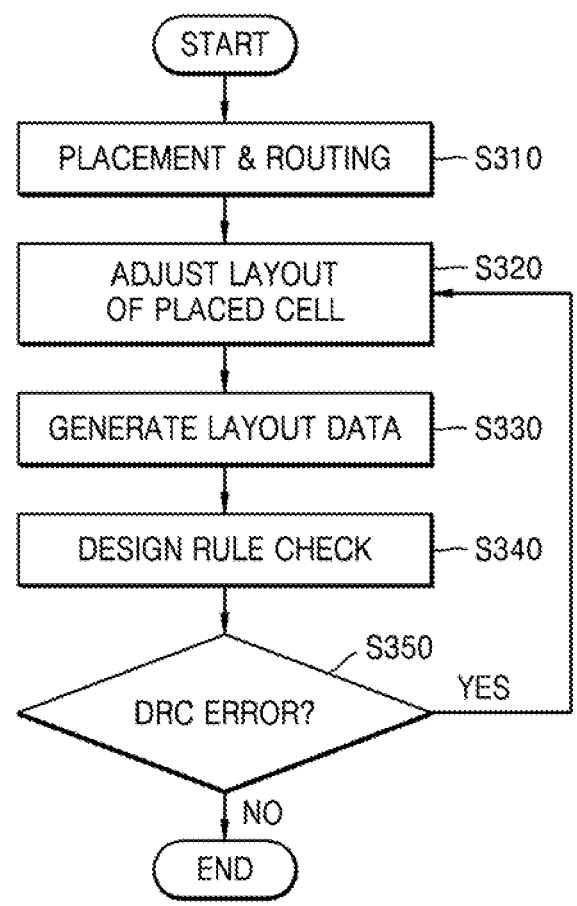
FIG. 16 is a flowchart schematically showing a method of designing an integrated circuit, according to an example embodiment.

FIG. 16 is a flowchart schematically showing a method of designing an integrated circuit, according to an example embodiment. The method of designing the integrated circuit described in FIG. 16 is, in detail, a method of designing a layout of the integrated circuit, and may be performed by using the P&R engine 131 and the DRC engine 132 shown in FIG. 14. FIG. 16 will therefore be described with reference to FIG. 14.

In operation S310, the P&R engine 131 may, based on the input data D10, e.g., the netlist data, place and route standard cells that are provided from the standard cell library F10.

Afterwards, in operation S320, the P&R engine 131 may adjust a layout of the cells placed in the operation S310. The P&R engine 131 may, based on the positions of the routing wirings, adjust the positions of the internal wirings of the placed cells that are formed in the same layer as that of the routing wirings.

In operation S330, the P&R engine 131 may, based on the layout formed in the operation S320, produce the layout data D20 regarding the integrated circuit.

In operation S340, the DRC engine 132 may, based on the design rule F20, perform design rule check operation S230 on the layout data D20. The DRC engine 132 may generate the DRC result D30.

In operation S350, the DRC engine 132 may determine whether there is a design rule error. The DRC engine 132 may, based on the DRC result D30, determine whether there is a design rule error.

When there is a design rule error, more particularly, when there is a design rule error regarding a distance between the routing wiring and the internal wiring, operation S320 may be repeated. The P&R engine 131 may adjust a layout of the placed cells. The P&R engine 131 may, based on the position of the routing wiring, adjust the positions of the internal wirings of the placed cells that are formed in the same layer as that of the routing wirings. Afterwards, operation S330, operation S340 and S350 may be repeated. The P&R engine 131 may reproduce the layout data, and the DRC engine 132 may perform the design rule check, based on the reproduced layout data, and determine whether there is a design rule error. When there is no design rule error, the layout design of the integrated circuit may be finished. Otherwise when there is a design rule error, the operation S320 is repeated, and thus, the layout of the placed cells may be adjusted.

Figure 17:
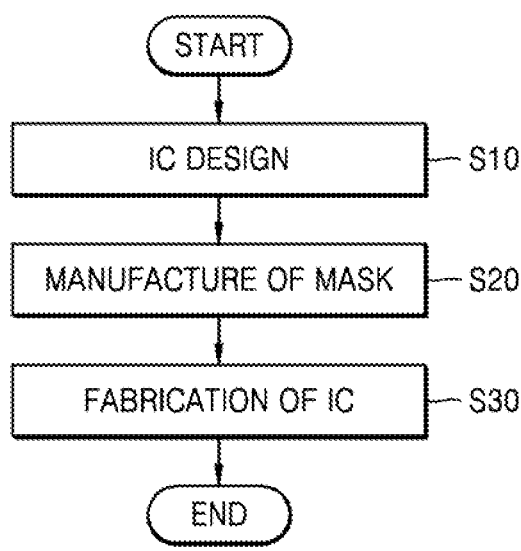
FIG. 17 is a flowchart schematically showing a method of fabricating an integrated circuit, according to an example embodiment.

FIG. 17 is a flowchart schematically showing a method of fabricating an integrated circuit, according to an example embodiment. The fabrication method may be divided into an operation of designing the integrated circuit (S10), and operations of fabricating the integrated circuit (S20 and S30). A process of fabricating the integrated circuit (which is also a process of fabricating a semiconductor device, i.e., the integrated circuit) based on the layout data, may be performed with a semiconductor process model.

In operation S10, an operation of designing the integrated circuit may be performed, which may be any of the IC design method embodiments described above with respect to FIGS. 1-16. To this end, the above-described logic synthesis, layout design, and verification operations may be performed. As described above with reference to FIGS. 1 through 16, during the layout of the integrated circuit, the position of the internal wiring of the cell may be adjusted based on the position of the routing wiring. Layout data having an adjusted position of the internal wiring of the cell may be produced.

Afterward, the operation of fabricating the integrated circuit may be performed. In operation S20, a mask may be manufactured based on the layout data. For example, based on the layout data, patterns formed in the plurality of layers may be defined, and at least one mask (or a photomask) for forming a pattern for each of the plurality of layers may be manufactured.

In operation S30, the integrated circuit may be fabricated by using the mask. For example, the integrated circuit may be fabricated by patterning the plurality of layers by using the at least one mask that is manufactured in the operation S20. Through the patterning process, desired patterns may be formed on a semiconductor substrate or a material layer. The fabrication process may include a deposition process, an etching process, an ion process, a cleaning process, and the like. In addition, the fabrication process may include a packaging process in which a semiconductor device is loaded on a printed circuit board (PCB) and encapsulated by encapsulation materials, or may include a test process to test a semiconductor device or a package.

In operation S30, a front-end-of-line (FEOL) process and a back-end-of-line (BEOL) process may be performed. FEOL may refer to a process of forming individual devices, for example, a transistor, a capacitor, a resistor, and the like, on a substrate in the process of fabricating the integrated circuit. The FEL may be patterned in the FEOL. In an embodiment, the FEOL may include planarizing and cleaning a wafer, forming a trench, forming wells (active regions), forming gate lines, forming a source and a drain. The FEOL may further include forming a lower level of a via and a lower level of a wiring layer, for example, the first via V0 (see FIG. 3B) and the first wiring layer M1 (see FIG. 3B). The BEOL may refer to a process of connecting individual devices, for example, a transistor, a capacitor, a resistor, and the like, with one another in the process of fabricating the integrated circuit. For example, the BEOL may include forming a higher level including a via and a higher level including a wiring layer. Through the BEOL process, the wiring patterns according to example embodiments, for example, the patterns in the internal wirings and the routing wirings may be formed, and the vias electrically connected to the internal wirings or the routing wirings may be formed. Afterwards, the integrated circuit may be packaged into a semiconductor package, and may also be used as an element of various applications.

Figure 18:
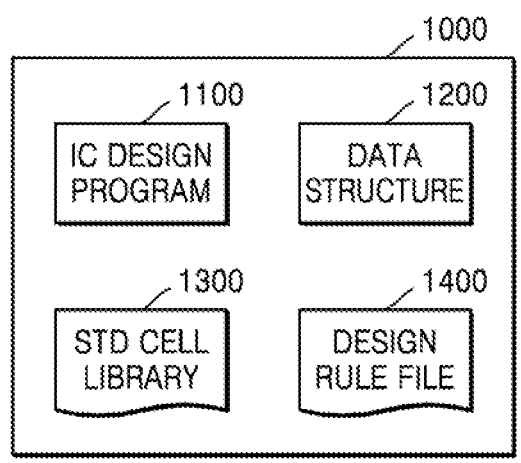
FIG. 18 is a computer-readable storage medium according to an example embodiment.

FIG. 18 shows a computer-readable storage medium 1000, according to an example embodiment. Computer-readable storage medium 1000 may store an IC design program 1100, a data structure 1200, a standard cell library 1300, and a design rule file 1400. The storage medium 1000, which is a computer-readable storage medium, may include any suitable storage medium that may be read by the computer while the storage medium is used for providing instructions and/or data to the computer. Examples for the storage medium 1000 that may be read by the computer may include: a magnetic or an optical medium, e.g., disc, tape, compact disc, read only memory (CD-ROM), digital versatile disc ROM (DVD-ROM), compact disc recordable (CD-R), compact disc rewritable (CD-RW), digital versatile disc recordable (DVD-R), digital versatile disc rewritable (DVD-RW), and the like; a volatile or non-volatile memory, for example, random access memory (RAM), read-only memory (ROM), flash memory, and the like; a non-volatile memory that may be accessed by using a universal serial bus (USB) interface; and microelectromechanical systems (MEMS), and the like. The computer-readable storage medium may be inserted into the computer, may be integrated in the computer, or may be combined with the computer via a communication medium such as a network and/or a wireless link.

The IC design program 1100 may include instructions or procedures for designing the integrated circuit by using the standard cell library 1300. For example, the IC design program 1100 may include a layout tool (for example, the P&R module), and may further include a logic synthesis tool, a verification tool (for example, the DRC module), and the like. The IC design program 1100 may, after placing and routing the instances of the standard cells, adjust a layout of the placed cells. More particularly, the IC design program 1100 may adjust the layout by adjusting the positions of the internal wirings of the cells, based on the positions of the routing wirings.

The data structure 1200 may include data to be processed by the IC design program 1100 (for example, schematic data), or data that is produced as the IC design program 1100 is executed (e.g. netlist, layout data, verification results, and the like). The layout data may include data regarding the layout that is exemplified in FIGS. 3A, 4B, 6B, 7B, 9B, 10, 12B, and 13.

The standard cell library 1300 may include data regarding logic devices included in the integrated circuit or data regarding unit circuits. In embodiments, the standard cell library 1300 may include data regarding a plurality of cells that have the same FELs but different BELs for the same standard cell. The IC design program 1100 may place a standard cell by selecting one of the plurality of cells or replace the placed cell, such that the distance between the routing wiring and the internal wiring of the cell is equal to or greater than the minimum distance based on the design rule.

The design rule file 1400 is a reference file when performing verification (for example, DRC verification and LVS verification) on the layout data. For example, the design rule file 1400 may include design rules, for example, a minimum distance or a maximum distance between patterns formed in a plurality of layers. For instance, the design rule may include a minimum distance between the wirings, a minimum distance between a via and an edge of the wiring, and the like.

The IC design program 1100 may, with reference to the design rule file 1400, perform verification on the layout data. The IC design program 1100 may adjust the layout of the placed cells when there is a design rule error, and more particularly, when the distance between the internal wiring and the routing wiring is less than the minimum distance. In the embodiment, the IC design program 1100 may, after placement and routing, adjust the layout of the placed cells, with reference to the design rule file 1400.

As described above, example embodiments have been disclosed in the drawings and the specification. While the inventive concept has been particularly shown and described with reference to embodiments thereof, it will be understood that various changes in form and details may be made therein without departing from the spirit and scope of the appended claims and their equivalents.

What is claimed is:

1. A computing system for designing an integrated circuit comprising standard cells, the computing system comprising:
   a memory storing a cell library comprising data regarding the standard cells, and instructions representing procedures; and
   a processor configured to access the memory and execute the instructions,
   wherein the processor comprises:
   a placement and routing engine configured to place and route the standard cells based on the cell library and adjust, in an instance of at least one standard cell, positions of internal wirings parallel to gate lines, based on positions of routing wirings that are placed in parallel to the internal wirings; and a design rule check (DRC) engine that performs design rule check on layout data that is produced by the placement and routing engine, wherein, in response to a determination by the DRC engine that a distance between an internal wiring of the internal wirings and a routing wiring of the routing wirings in the layout data is less than a minimum distance according to a design rule, the placement and routing engine is configured to adjust a position of the internal wiring while maintaining the positions of the routing wirings with uniform spacing therebetween, so that the distance between the internal wiring and any of the routing wirings is at least the minimum distance.

2. A computing system for designing an integrated circuit comprising standard cells, the computing system comprising:

a memory storing a cell library comprising data regarding the standard cells, and instructions representing procedures; and a processor configured to access the memory and execute the instructions, wherein the processor comprises:

a placement and routing engine configured to place and route the standard cells based on the cell library and adjust, in an instance of at least one standard cell, a position of an internal wiring parallel to gate lines, based on positions of routing wirings placed in parallel to the internal wiring; and a design rule check (DRC) engine that performs design rule check on layout data that is produced by the placement and routing engine, wherein, the cell library, with respect to the at least one standard cell, comprises a plurality of cells respectively having different positions of the internal wirings, and in response to a determination by the DRC engine that a distance between the internal wiring and any of the routing wirings in the layout data is less than a minimum distance according to a design rule, the placement and routing engine is configured, in view of the positions of the routing wirings, to adjust the position of the internal wiring while maintaining the positions of the routing wirings with uniform spacing therebetween, by replacing a cell that is applied as the instance from among the plurality of cells, with another cell so that a distance between the internal wiring of said another cell and any of the routing wirings is at least the minimum distance.

3. The computing system of claim 1, wherein the at least one standard cell comprises a multi-bit flip-flop.

4. The computing system of claim 1, wherein:

the internal wiring of the standard cell is a first internal wiring;

the standard cell includes a second internal wiring parallel to the first internal wiring; and the placement and routing engine is configured to adjust a position of the second internal wiring by a same distance and in a same direction as for the adjustment of the first internal wiring, such that a distance between the second internal wiring and any of the routing wirings is at least the minimum distance.

5. The computing system of claim 1, wherein the placement and routing engine is configured to:

define uniformly spaced routing tracks and uniformly place the routing wirings so they are aligned with every N routing tracks, where N is an integer of two or more;

initially place the internal wiring aligned with one of the routing tracks between adjacent routing wirings; and adjust the internal wiring so that it is between adjacent routing tracks in response to the determination by the DRC engine.

\* \* \* \* \*